(12) United States Patent
Williams

(10) Patent No.: US 6,351,890 B1
(45) Date of Patent: Mar. 5, 2002

(54) LASER LIGHT REFERENCING TOOL

(76) Inventor: Nigel Emlyn Williams, 14 Wandsworth Bridge Road, London SW6 2TJ (GB)

( * ) Notice: Subject to any disclaimer, the term of this patent is extended or adjusted under 35 U.S.C. 154(b) by 0 days.

(21) Appl. No.: 09/254,543

(22) PCT Filed: Sep. 10, 1997

(86) PCT No.: PCT/GB97/02488

§ 371 Date: Mar. 9, 1999

§ 102(e) Date: Mar. 9, 1999

(87) PCT Pub. No.: WO98/11407

PCT Pub. Date: Mar. 19, 1998

(30) Foreign Application Priority Data

Sep. 10, 1996 (GB) .............................................. 9618834
Jul. 15, 1997 (GB) .............................................. 9714878

(51) Int. Cl.⁷ .......................... G01C 15/02; G01C 9/12
(52) U.S. Cl. ...................... 33/286; 33/391; 33/DIG. 21
(58) Field of Search ...................... 33/227, 273, 275 R, 33/282, 283, 285, 286, 374, 375, 391, DIG. 21

(56) References Cited

U.S. PATENT DOCUMENTS

| | | | | |
|---|---|---|---|---|
| 2,693,642 A | * | 11/1954 | Lacefield | ..................... 33/285 |
| 2,859,725 A | * | 11/1958 | Genasci | ....................... 33/391 |
| 2,968,873 A | * | 1/1961 | Holderer | ...................... 33/374 |
| 3,427,724 A | * | 2/1969 | Tracy | ........................ 33/283 |
| 4,144,653 A | * | 3/1979 | Gardner | ....................... 33/391 |
| 5,075,977 A | | 12/1991 | Rando | ......................... 33/227 |
| 5,519,942 A | * | 5/1996 | Webb | ................... 33/DIG. 21 |
| 5,531,031 A | | 7/1996 | Green | ......................... 33/286 |
| 5,666,736 A | * | 9/1997 | Wen | ........................ 33/275 R |
| 5,836,081 A | * | 11/1998 | Orosz, Jr. | .............. 33/DIG. 21 |
| 5,842,282 A | * | 12/1998 | Ting | .................... 33/DIG. 21 |
| 6,012,229 A | * | 1/2000 | Shiao | ................... 33/DIG. 21 |

FOREIGN PATENT DOCUMENTS

| | | |
|---|---|---|
| DE | 44 42 224 A1 | 5/1996 |
| EP | 3 341 812 A1 | 11/1989 |
| EP | 0729 053 A2 | 8/1996 |

\* cited by examiner

*Primary Examiner*—G. Bradley Bennett
(74) *Attorney, Agent, or Firm*—Sughrue Mion, PLLC

(57) ABSTRACT

A laser light referencing tool comprises laser means for emitting a visible laser beam, portable power means for powering the laser means, and gravity-responsive directional means for establishing a datum direction for the laser means, the gravity-responsive directional means preferably being batteries contained within a cylindrical housing which is axially attached to another cylindrical housing in such a manner that the relative rotational positions of the two cylindrical housings are controlled by friction.

20 Claims, 21 Drawing Sheets

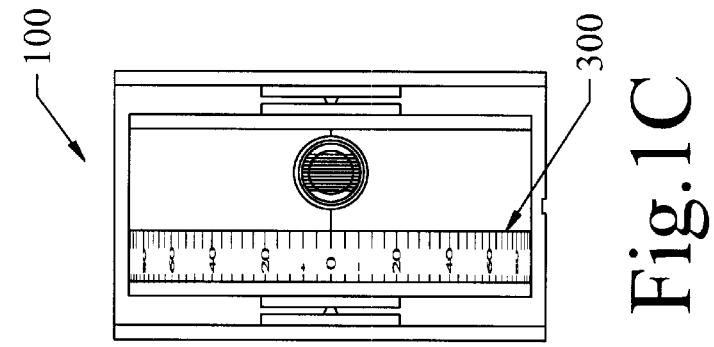
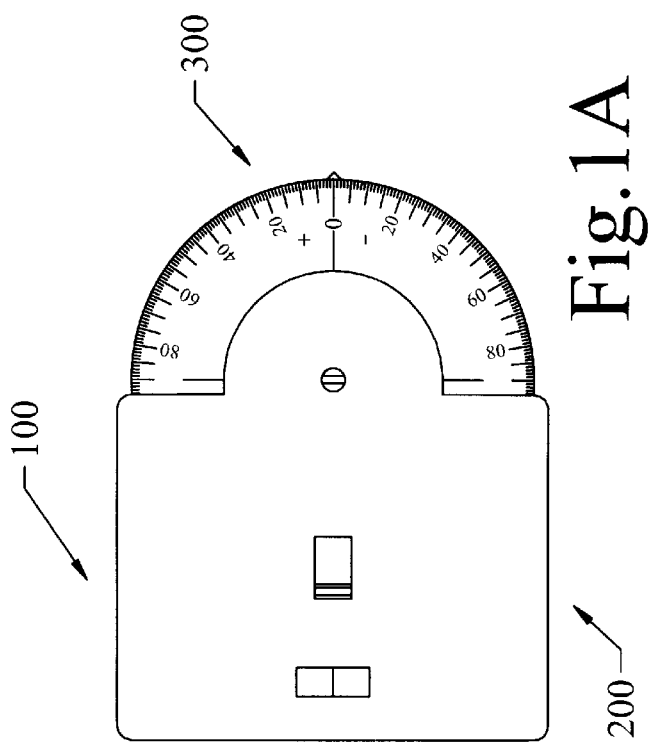
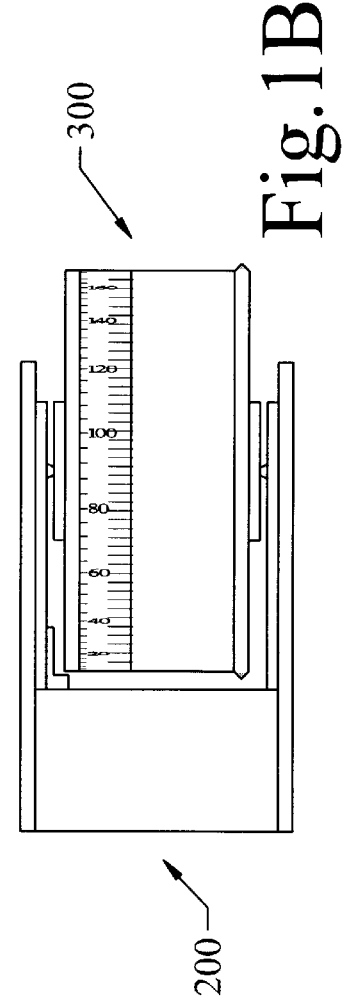

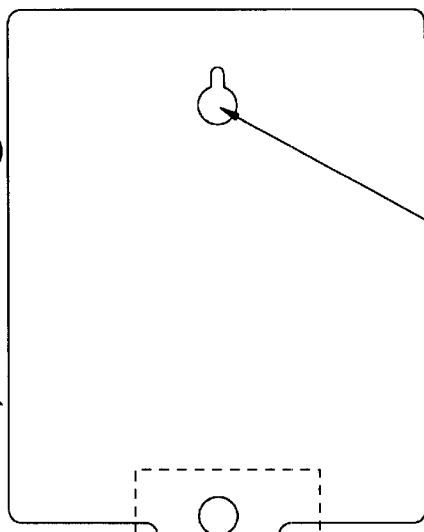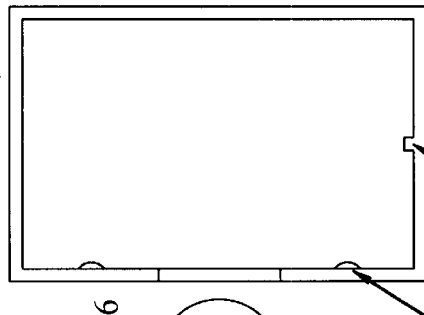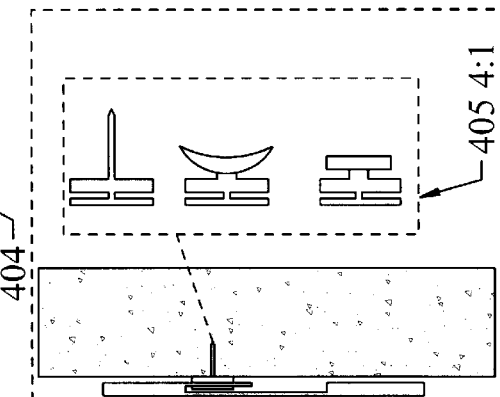
Fig.9d
Fig.9e
Fig.9c
Fig.9a
Fig.9b

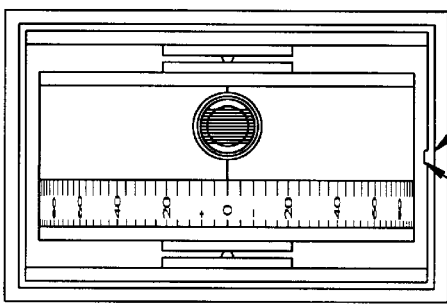
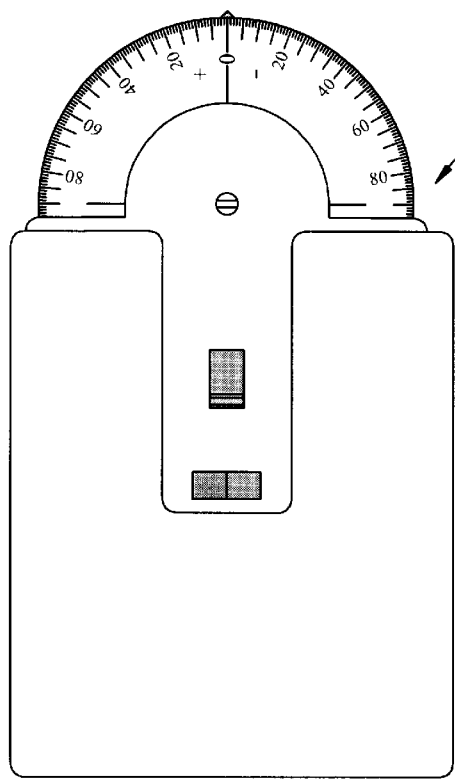
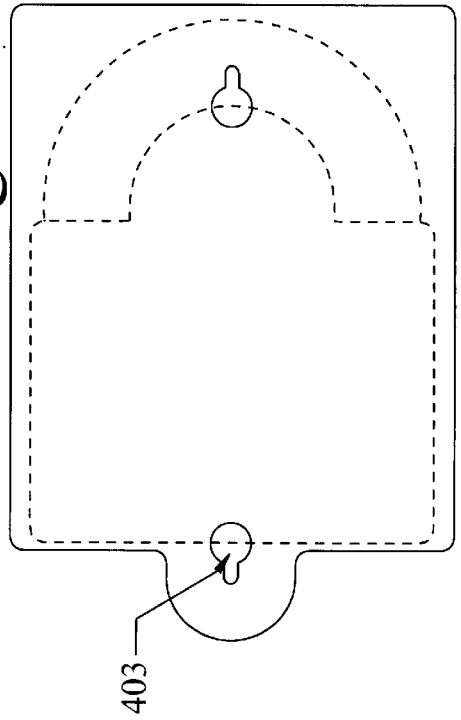
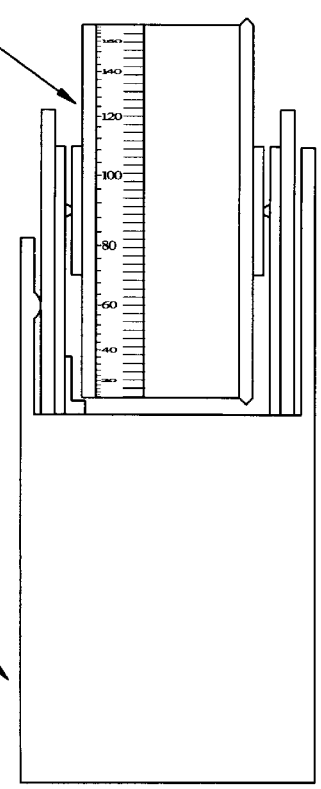

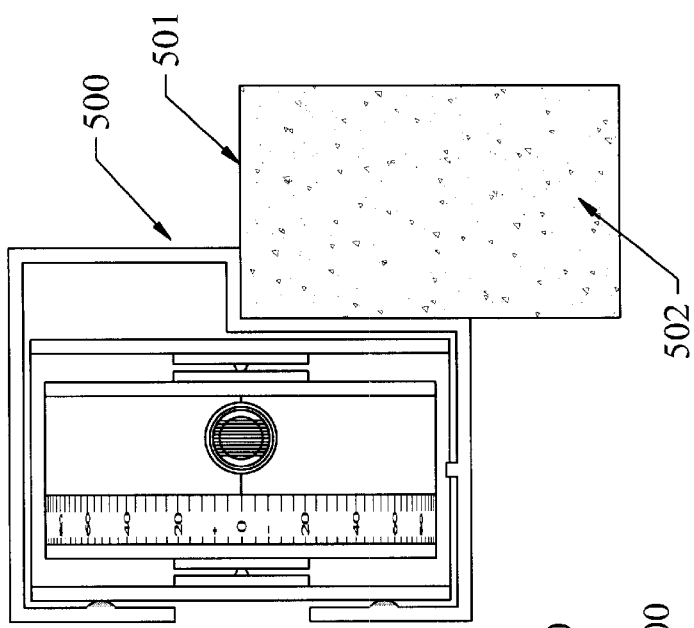
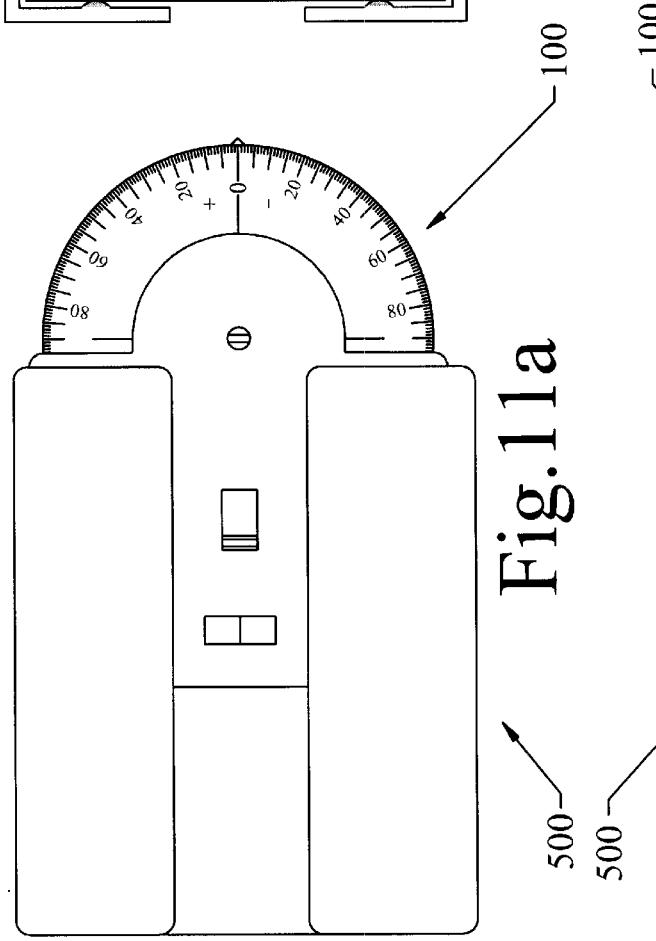
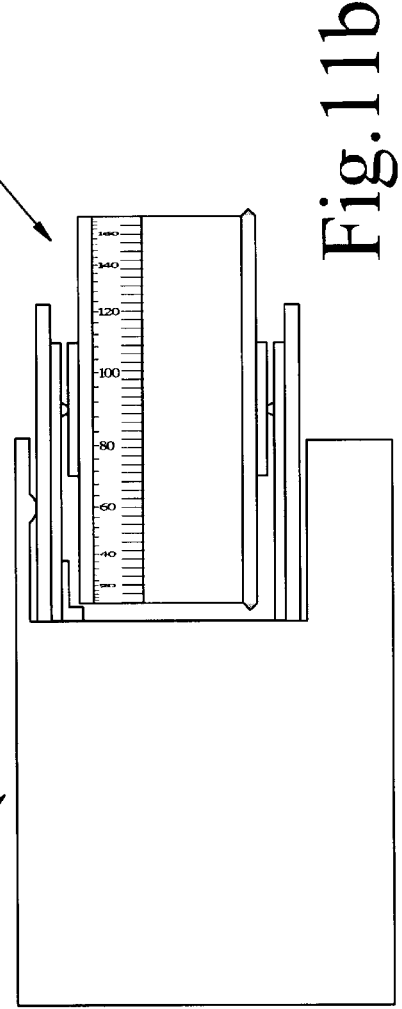

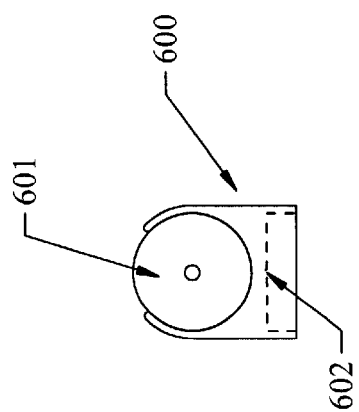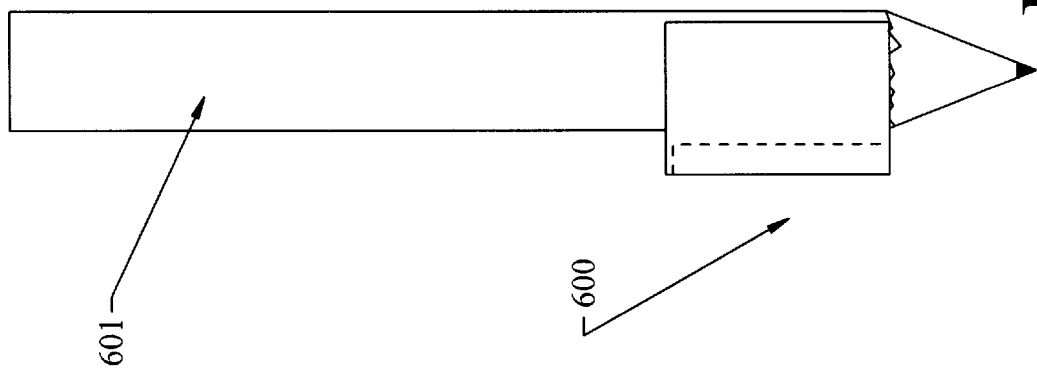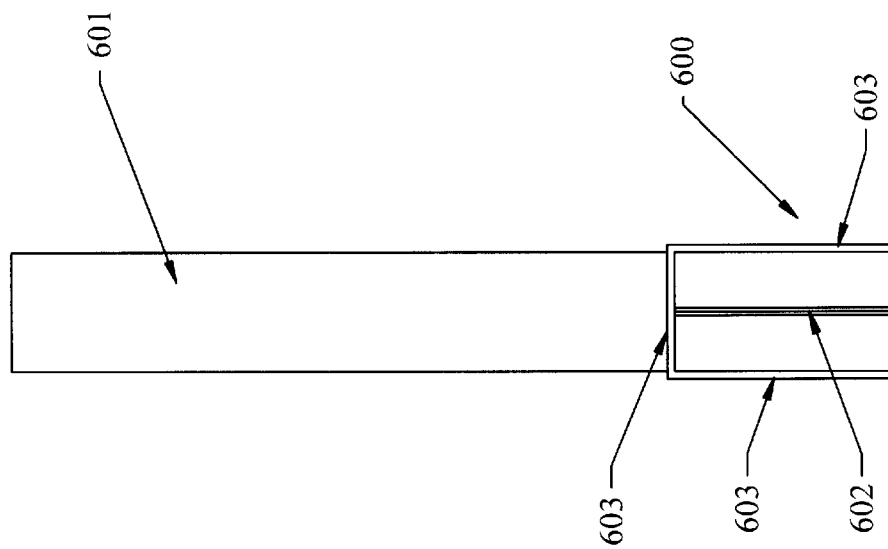

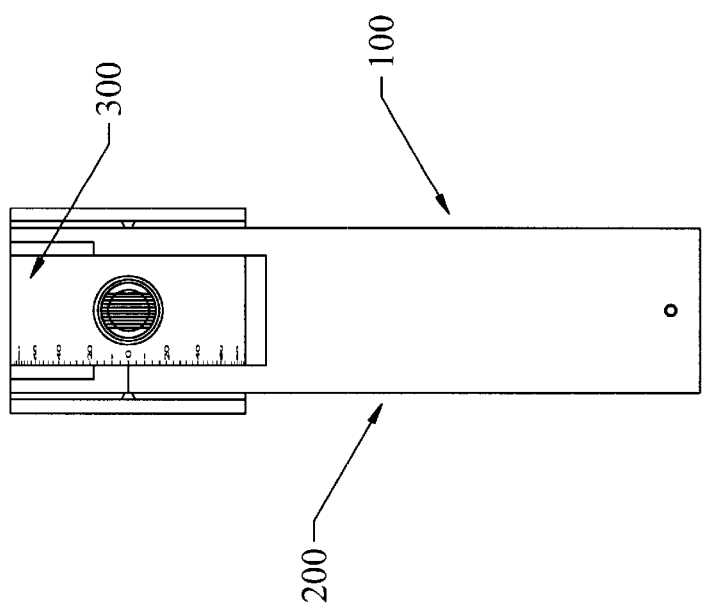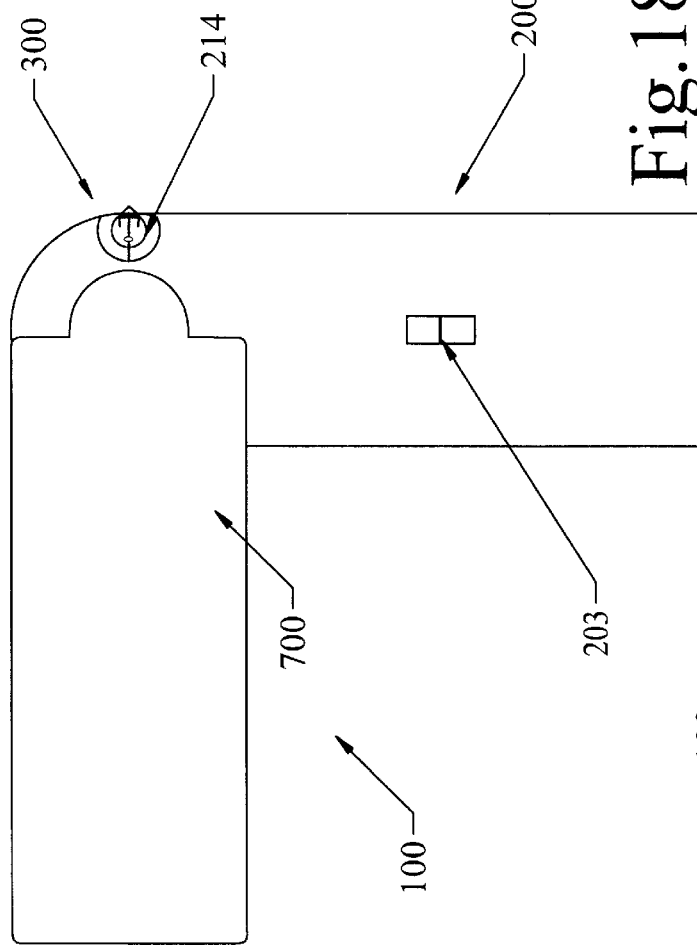

LASER LIGHT REFERENCING TOOL

The invention is generally in the field of hand tools and levelling devices, and is more particularly concerned with the relatively precise marking of reference lines at any angle over a generally flat surface. The compactness, portability and relative accuracy of the invention render it of great usefulness to the professional builder and carpenter, while the ease of use and lack of skill needed in the operation of the invention make it of particular use to the DIY enthusiast.

There have been a number of surveying and carpentry tools employing the use of beams of light generated by lasers. Most of these have concerned themselves with producing a horizontal plane of light from a floor or tripod-mounted unit and have addressed the needs of large constructional and civil engineering works. Early devices were relatively cumbersome, required precise manual levelling and utilised helium-neon lasers which required mains electricity supplies.

According to the present invention, however, a laser light referencing tool comprises laser means for emitting a visible laser beam, portable power means for powering the laser means, and gravity-responsive directional means for establishing a datum direction for the laser means.

The gravity-responsive means may include one or more batteries and/or may include one or more other weights.

Preferably, control means is provided for enabling the laser means to be moved in a controlled manner so that the visible laser beam is emitted in a controlled direction relative to said datum direction.

Said control means may be based on friction and the friction may be adjustable—said control means may be such as to allow the laser means to be fully rotatable, rather than merely pivotable, to allow the laser means to be set at any selected angle within 360°.

It will thus be appreciated that the present invention can provide a hand-portable tool capable of producing a reference line at any angle in any single plane. When used as a levelling device against a generally vertical surface, a reference line will be projected over that surface generally at the horizontal or at any preset angle away from the horizontal, despite the angle at which the tool is held against the substantially vertical surface, and without the need for any pre-levelling of the instrument. It will also be appreciated that the tool of the present invention can be rugged and lightweight as well as compact and portable.

Preferably, the present invention is a small rugged referencing tool which is compact and light enough to be easily held in the palm of one hand, leaving the other hand free to mark the generally vertical surface over which the reference line is projected by the tool. The operator may mark such a line over as wide a span as his or her arms will allow. When placed against the generally vertical surface, the case of the tool or any attached handle may be held at any angle, and in either hand without altering the angle of the displayed reference line. The tool may also be placed on any convenient generally horizontal surface, or on a suitable stand or tripod, allowing a completely hands-free operation over the tool's range. This range is dependent only on the power of the laser means employed, and the quality of the optical elements used. Means are also disclosed as to how the tool may be fixed to the generally vertical surface being referenced, allowing similar hands-free operation.

Attachments are described which enhance the tool's versatility, allowing it to be used to provide a visible reference line as an extension to a surface, (either substantially horizontal/vertical, at any preset angle away from the horizontal or along the same plane as the surface of origin), and as a tool for providing a visible reference line at any angle over any plane.

A means of overcoming the obscuring effect of strong ambient light, such as direct sunlight, is also disclosed.

Other arrangements are described which can provide a pair of reference points at the generally horizontal, or at any angle away from the generally horizontal, across open space.

A first embodiment has a case containing batteries which supply power to a laser diode contained in a first axially pivoted cylindrical housing. This cylindrical housing and its contents are substantially in balance around its axis. Any imbalance in this housing may be rectified by an adjustable weight in the form of a fine balancing slug threaded into a balancing weight set in the housing. Via optical means including a collimating lens and a line producing lens, the laser diode produces a beam of light, divergent in a single plane only, along the radial line of the cylindrical housing. Thus, when placed close to and generally parallel to a generally vertical, generally flat surface, a horizontally divergent beam will strike the surface at an oblique angle, and a thin line of light of generally uniform thickness will be projected over that surface.

Axially attached to the laser diode housing is a second cylindrical housing containing an eccentric weight. The effect of gravity on this eccentric weight makes a zero to one hundred and eighty degree line marked on the outside of the second cylindrical housing align generally with the horizontal. The alignment of the second cylindrical housing may be finely adjusted by a balancing slug threaded into the eccentric weight. When the two cylindrical housings are rotated relative to each other, friction between the two housings maintains the angle of rotation. As the cylindrical housing containing the laser diode and its associated circuitry is generally in balance around its axis, whatever the preset angle of rotation of the laser diode housing, no significant deviation will be experienced by the cylindrical housing containing the eccentric weight. Thus, the beam of visible light output by the laser diode may be preset to the horizontal or any angle away from the horizontal.

Adjustable point bearings on the axis of the cylindrical laser diode/weight assembly not only allow the free rotation of that assembly, but, being made of an electrically conductive material, supply electrical power from the batteries in the case of the tool to the laser diode assembly, without the need for connecting wires which would impede the free rotation of the assembly.

A switch can be included in the tool to interrupt the electrical supply, and an electronic timing circuit can also be included to provide an automatic shut-down of power after a predetermined time in order that battery life may be conserved. A visible indicator of the laser diode's operation, such as. a low-power flashing LED might also be used. A mechanical locking device can allow the cylindrical housing containing the eccentric weight to be rendered immobile relative to the case of the tool, while still allowing the cylindrical housing containing the laser diode assembly to be rotated. Thus, a line of light at a preset angle relative to the outside surface of the case of the tool may be projected over any generally flat surface against which, or on which the tool is placed.

A second embodiment utilises a pair of laser diodes mounted back to back in a cylindrical housing. Two beams, axially in general alignment are projected from the housing via optical means including collimating lenses and plain lenses. This cylindrical housing is connected to a cylindrical housing containing an eccentric weight as detailed above, and may be similarly rotated relative to it. With the tool held generally vertically, two beams of substantially non-divergent laser light are projected radially at the horizontal, or at a preset angle away from the horizontal. Two points are illuminated by the beams of light, the angle between them relative to the horizontal being determined by the angle of rotation of one cylindrical housing relative to the other.

A third embodiment has a single laser diode mounted radially in, and pointing to the centre of, a cylindrical housing. At the centre of this housing is fixed a right-angled mirror. This mirror splits the beam of laser light and projects two beams radially from the housing in a similar manner to that detailed above.

A fourth embodiment has a laser diode, associated circuitry, collimating lens, line generating lens, balancing weight and fine balancing slug mounted in a cylindrical housing as in the first embodiment. The cylindrical housing is axially attached via studs to one end of an elongate pendular assembly including two composite strips of electrically conducting and non-conducting material. Friction prevents the cylindrical housing from rotating freely, but this friction may be overcome by finger pressure. Set into the other end of these strips are metal discs with conical depressions. Threaded pointed screws, attached to a case of the tool, engage in these depressions. Electrically conducting strips connect these screws with wires which in turn connect via a switch to batteries. Electrical power is thus supplied to the laser diode via the pointed screws, from which the composite strips and cylindrical housing depend. Mounted in the cylindrical housing are two identical weights. The cylindrical housing is thus generally in balance around its axis. Markings on the surface of the cylindrical housing allow the housing to be rotated to a preset angle relative to the composite strips and hence relative to the generally vertical. Thus a line of light at a preset angle may be projected over a generally vertical, generally flat surface as detailed in the first embodiment. The other end of the elongate pendular assembly is rotatably mounted to a holding case.

A fifth embodiment has a laser diode, associated circuitry, collimating lens and line generating lens mounted in a cylindrical housing. The cylindrical housing is axially attached via studs to one end of an elongate pendular assembly in the form of a battery case. Friction prevents the cylindrical housing from rotating freely, but this friction may be overcome by finger pressure. Said one end of the elongate pendular assembly is also rotatably mounted to a holding case, the battery case/laser diode housing assembly being pivotable relative to the holding case by means of pointed threaded screws and metal rings with conical depressions as described in the first embodiment. The battery case of this fifth embodiment performs the function of the axially connected eccentric weight housing of the first embodiment. Gravity acts on it so that it hangs generally vertically from the pointed screw bearings. When the cylindrical housing is rotated to a preset angle relative to the battery case, a line of light at a preset angle may be projected over a generally vertical, generally flat surface as detailed in the first embodiment.

A sixth embodiment, which is the currently preferred embodiment, is similar to the first embodiment in including first and second cylindrical housings whose relative rotational positions are controlled by friction. However, the gravity-responsive directional means now comprises the portable power means (one or more batteries). Said first and second cylindrical housings are rotatably mounted at one end of a holding case, and are rotatably mounted to the holding case by means of a magnetised suspension assembly. Access to said first and second cylindrical housings is via a curved clear window which is a friction fit with the holding case. The other end of the holding case is provided with a plurality of translucent windows carrying parallel markings. There may be three translucent windows arranged respectively at said other end and at two sides of the holding case.

Individual features of the various embodiments may be combined differently.

The accompanying schematic drawings serve to illustrate preferred embodiments of the present invention so that the principles of the invention may be fully explained.

FIGS. 1(*a*), 1(*b*) and 1(*c*) are, respectively, life-size front, underneath and right end views of a hand-held referencing tool in accordance with a first embodiment of the invention for levelling, plumbing, aligning and projecting reference lines over a generally flat surface.

FIGS. 2(*a*), 2(*b*) and 2(*c*) are sectional views through FIGS. 1(*a*), 1(*b*) and 1(*c*).

FIGS. 9(*a*), 9(*b*), 9(*c*), 9(*d*) and 9(*e*) show, respectively, front, underneath, right end, rear and partial enlargement views of a carrying case/extension handle to enable hands-free operation of the tool.

FIGS. 10(*a*), 10(*b*), 10(*c*) and 10(*d*) show, respectively, front, underneath, right end and rear views of the carrying case/extension handle in different combinations with the tool shown in FIG. 10(*e*) which is a slight modification of the tool of FIG. 1(*a*).

FIGS. 11(*a*), 11(*b*) and 11(*c*) correspond to FIGS. 10(*a*), 10(*b*) and 10(*c*), but show a suitable accessory for enhancing the tool's versatility, allowing it to be used to provide a visible reference line as an extension to a surface, (either substantially horizontal/vertical or along the same plane as the surface of origin), and as a tool for providing a visible reference line at any angle over any plane.

FIGS. 12(*a*), 12(*b*) and 12(*c*) show, respectively, front, side and lower end views of a marking accessory for conditions of very bright ambient light.

Figure 13:
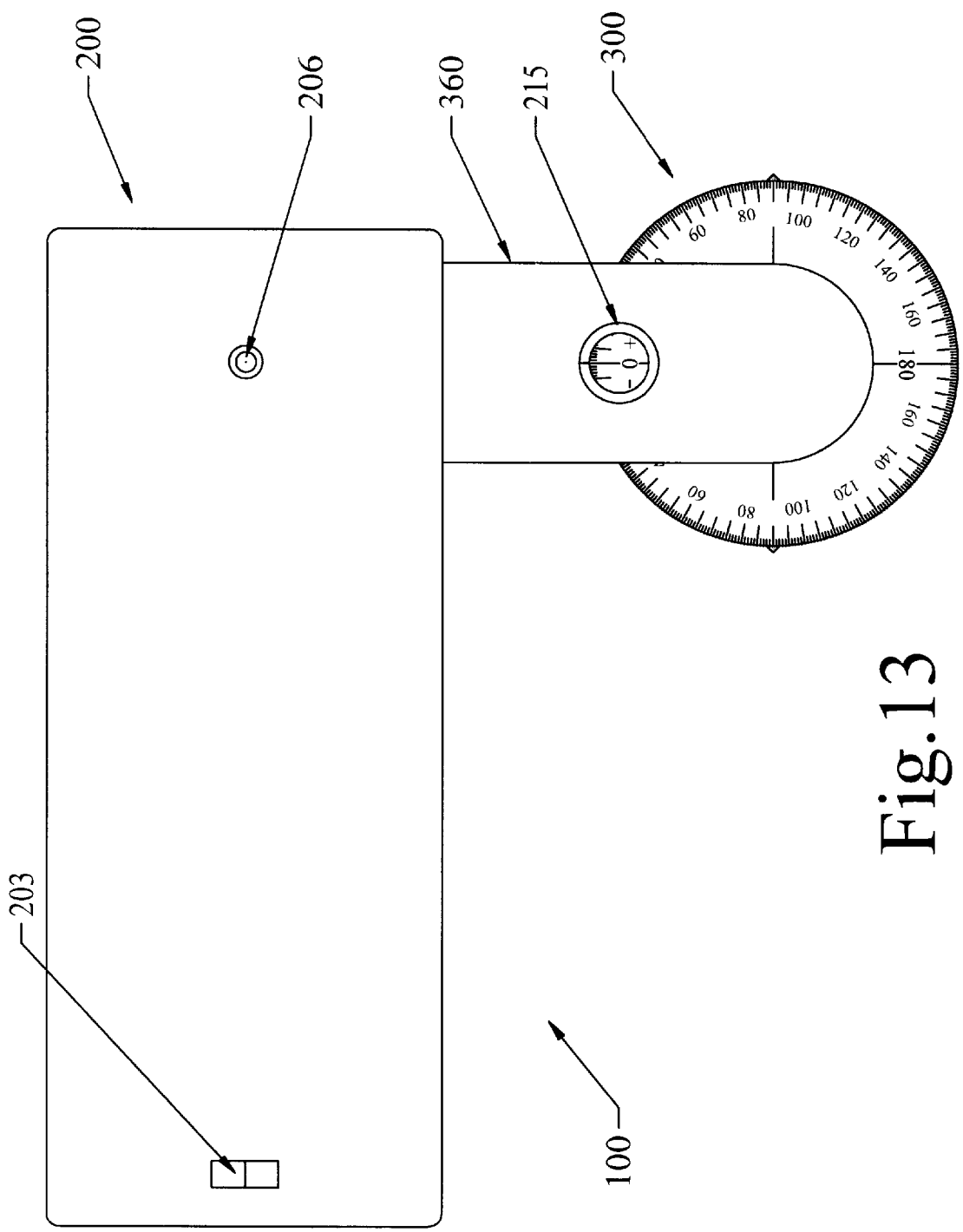

FIG. 13 is a life-size view of a fourth embodiment, in which the cylindrical assembly is pivotable relative to the case.

Figure 14C:
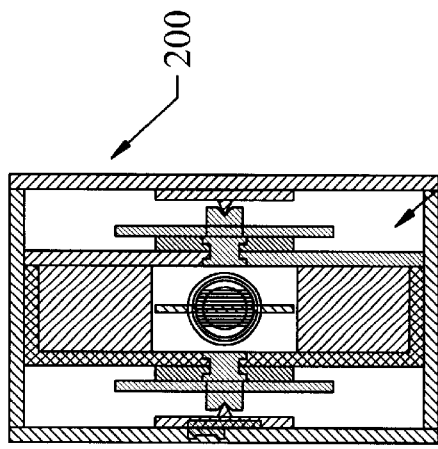
Figure 14A:
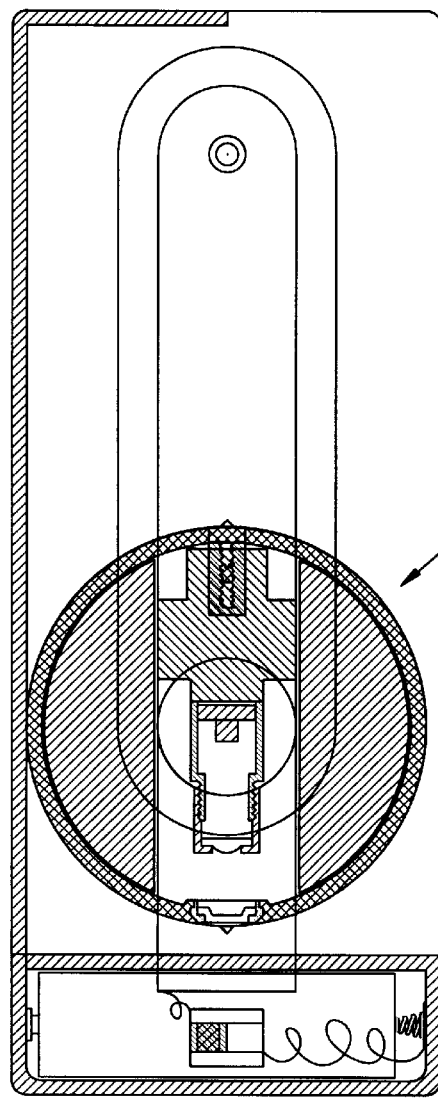
Figure 14B:
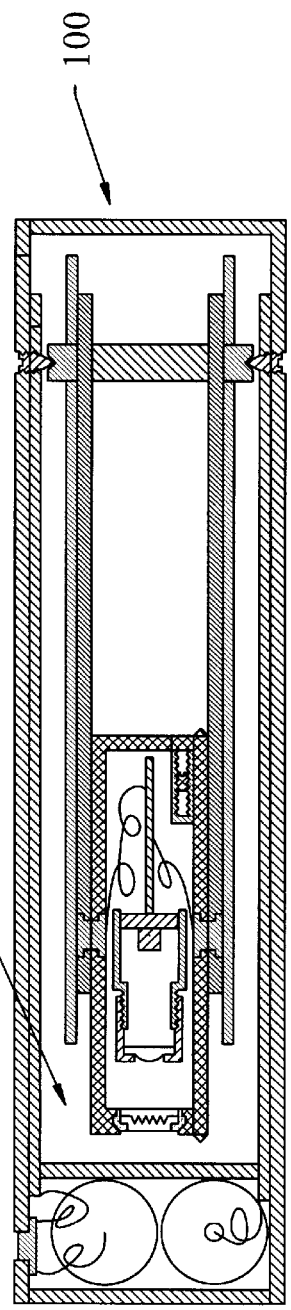

FIGS. 14(*a*), 14(*b*) and 14(*c*) correspond to FIGS. 2(*a*), 2(*b*) and 2(*c*), but show the fourth embodiment.

Figure 3:
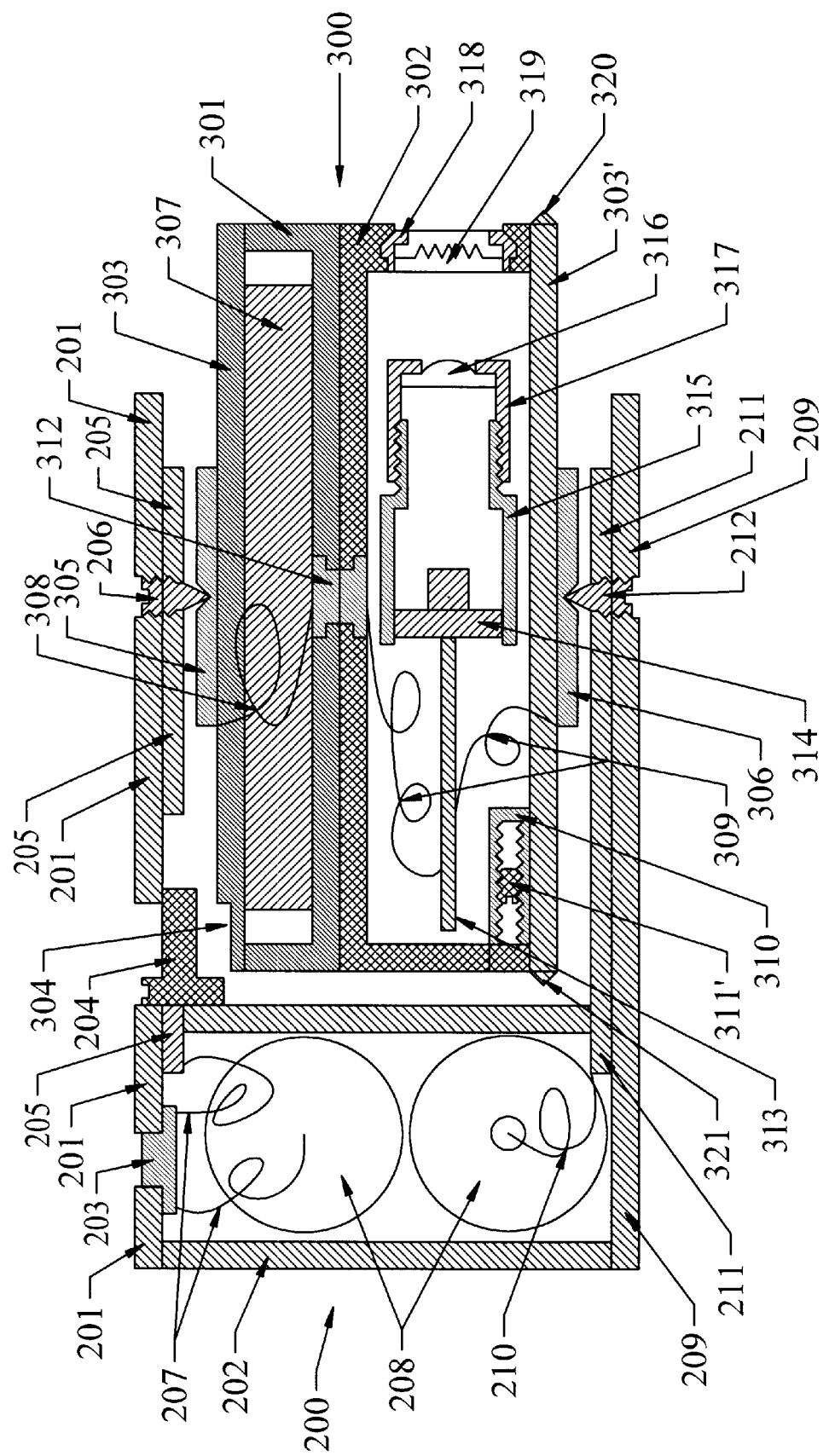
FIG. 3 is a twice life-size longitudinal sectional view through the first embodiment.
Figure 4:
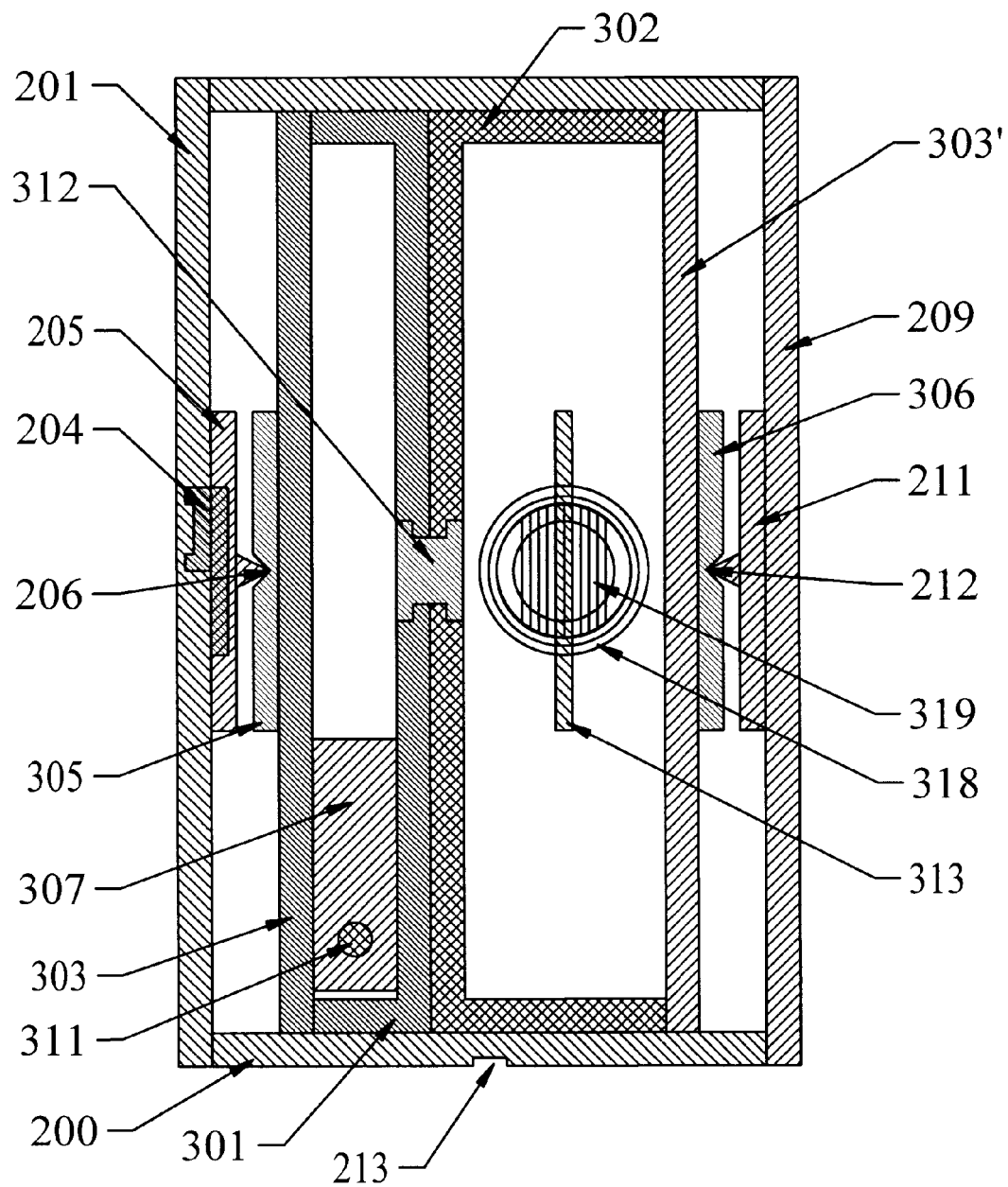
FIG. 4 is a twice life-size latitudinal sectional view through the first embodiment.
Figure 5:
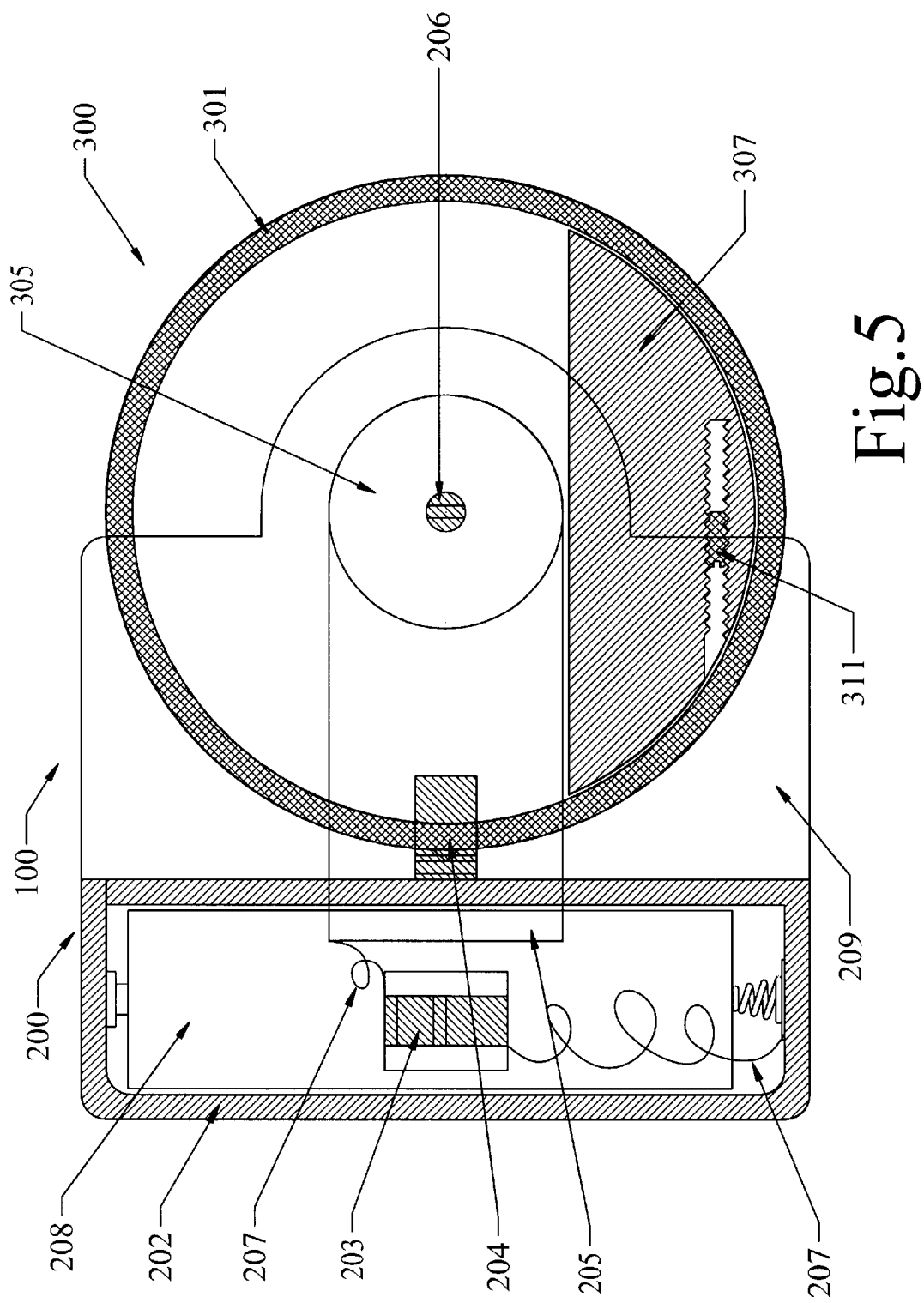
FIG. 5 is a twice life-size elevational sectional view through the first embodiment, showing particularly the cylindrical case containing the eccentric weight.
Figure 6:
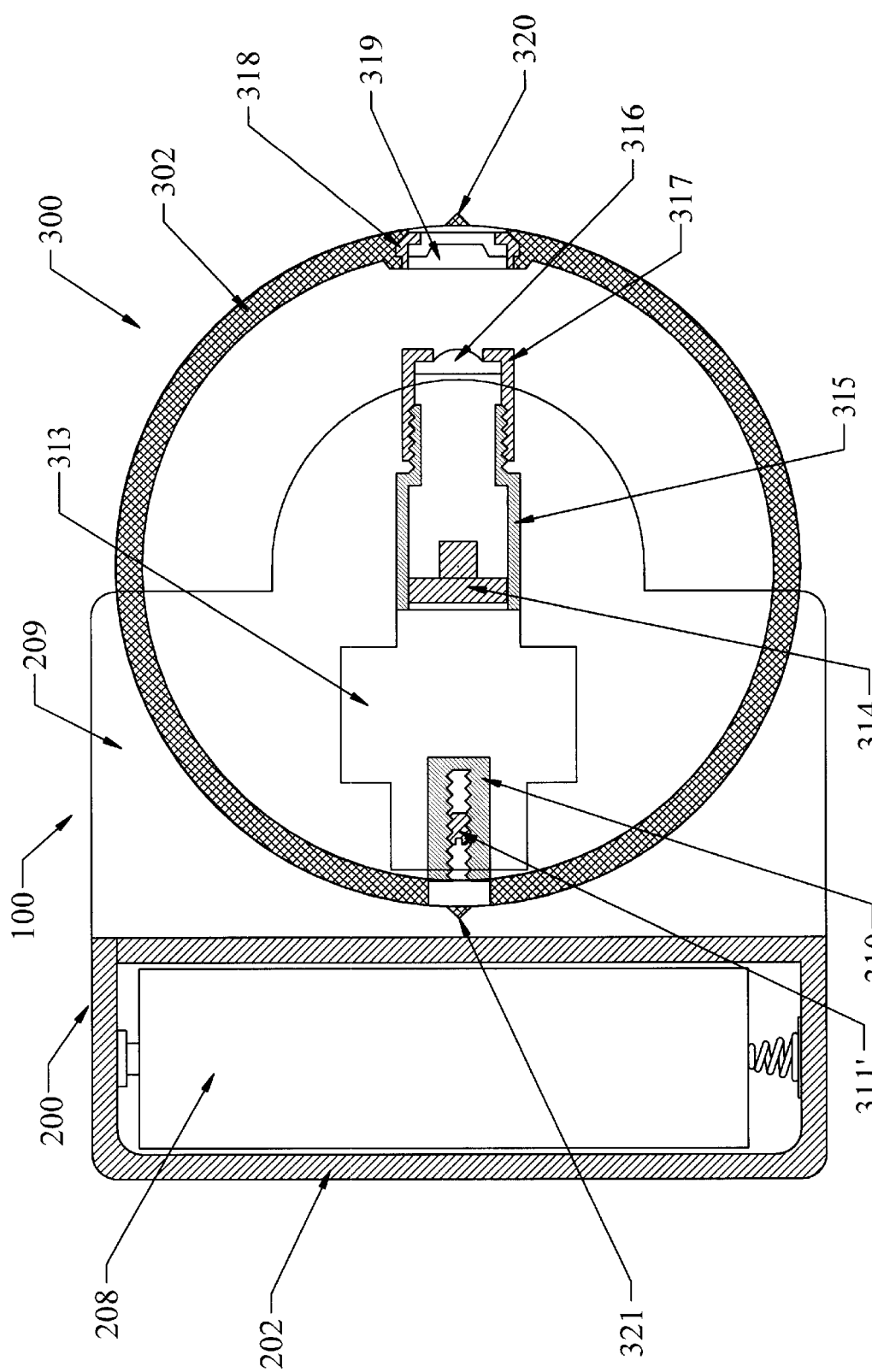
FIG. 6 is a twice life-size elevational sectional view through the first embodiment, showing particularly the cylindrical case containing the laser diode assembly, optics and adjustable balancing weight.
Figure 15:
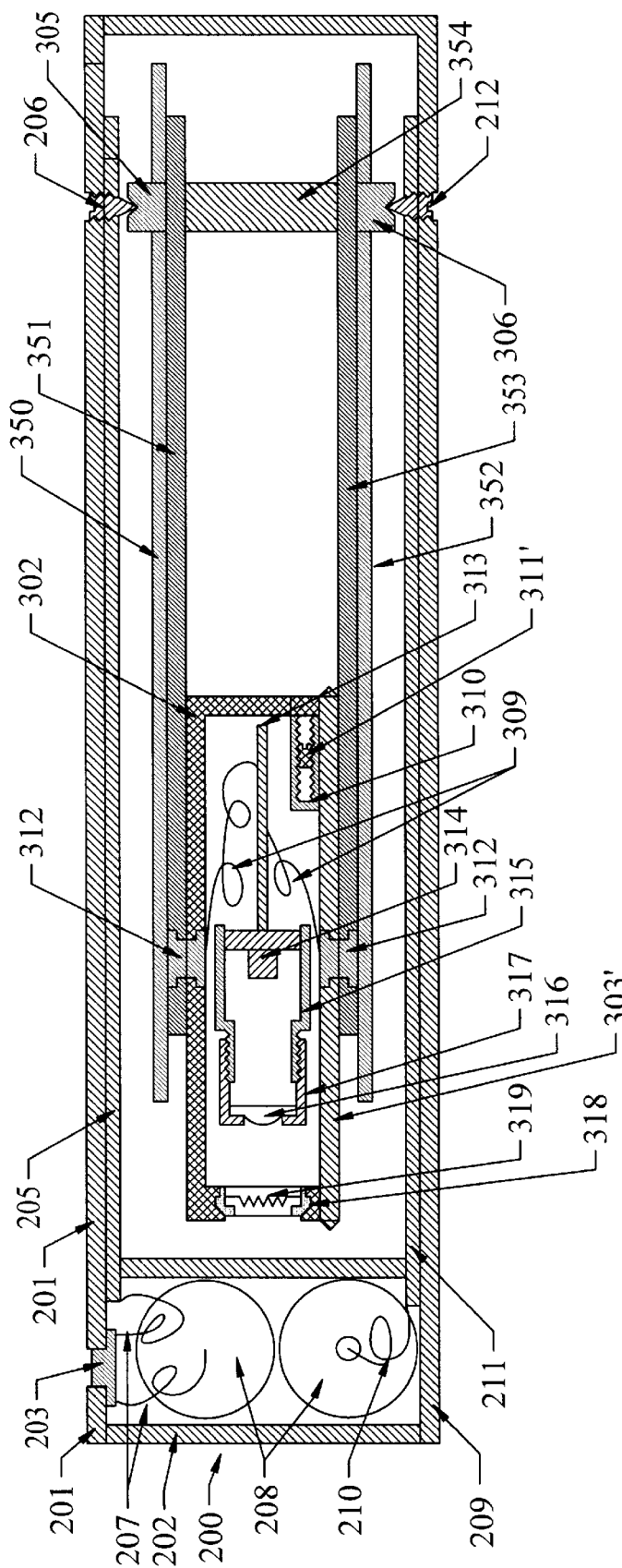
Figure 16:
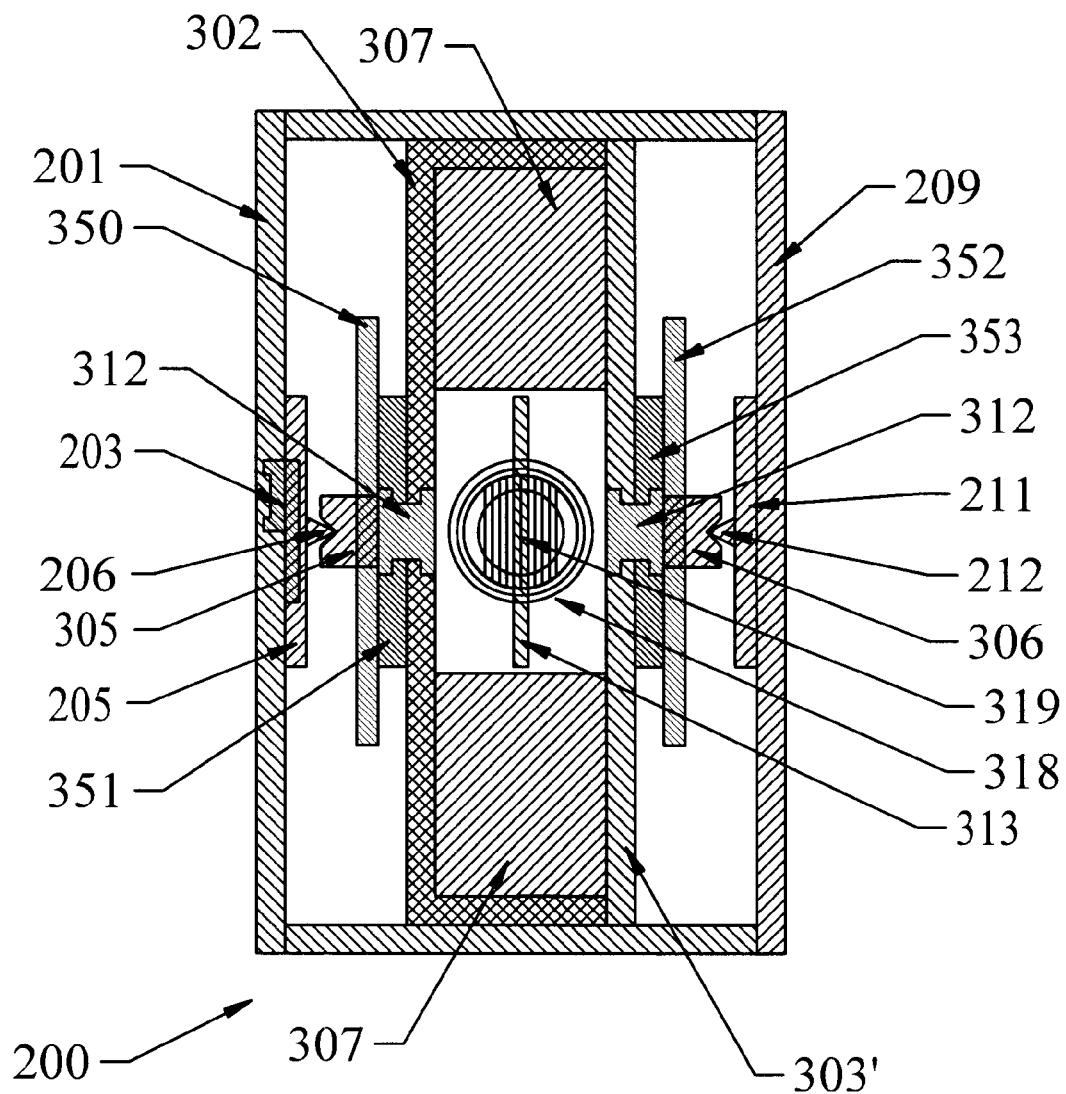
Figure 17:
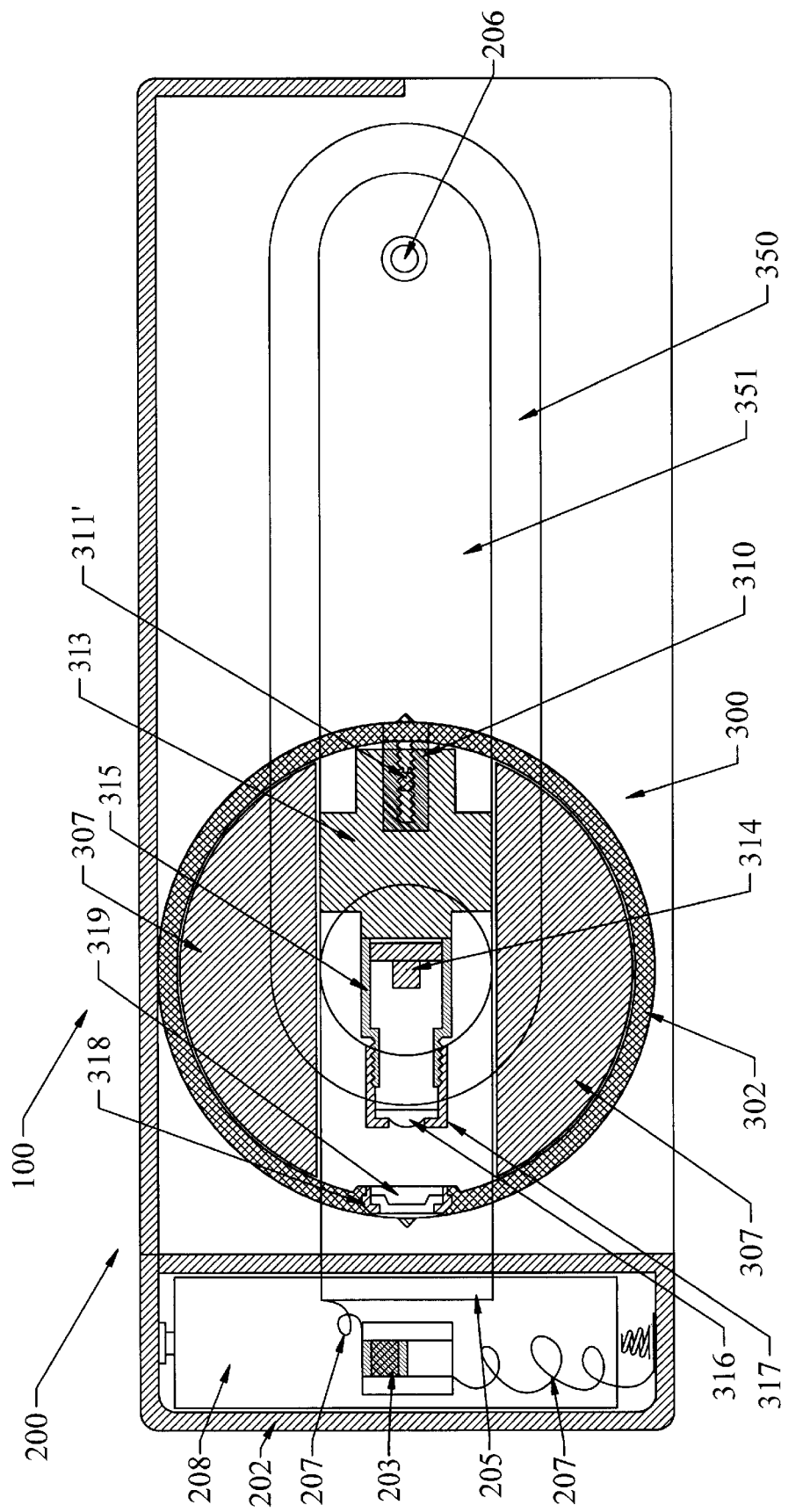

FIGS. 15, 16 and 17 correspond to FIGS. 3, 4 and 6 but are one and a half times life-size views of the fourth embodiment.

FIGS. 18(*a*), 18(*b*) and 18(*c*) are, respectively, life-size front (opened), front (closed) and right end (opened) views of a fifth embodiment, in which the tool is pivotable relative to a slip case.

Figure 19:
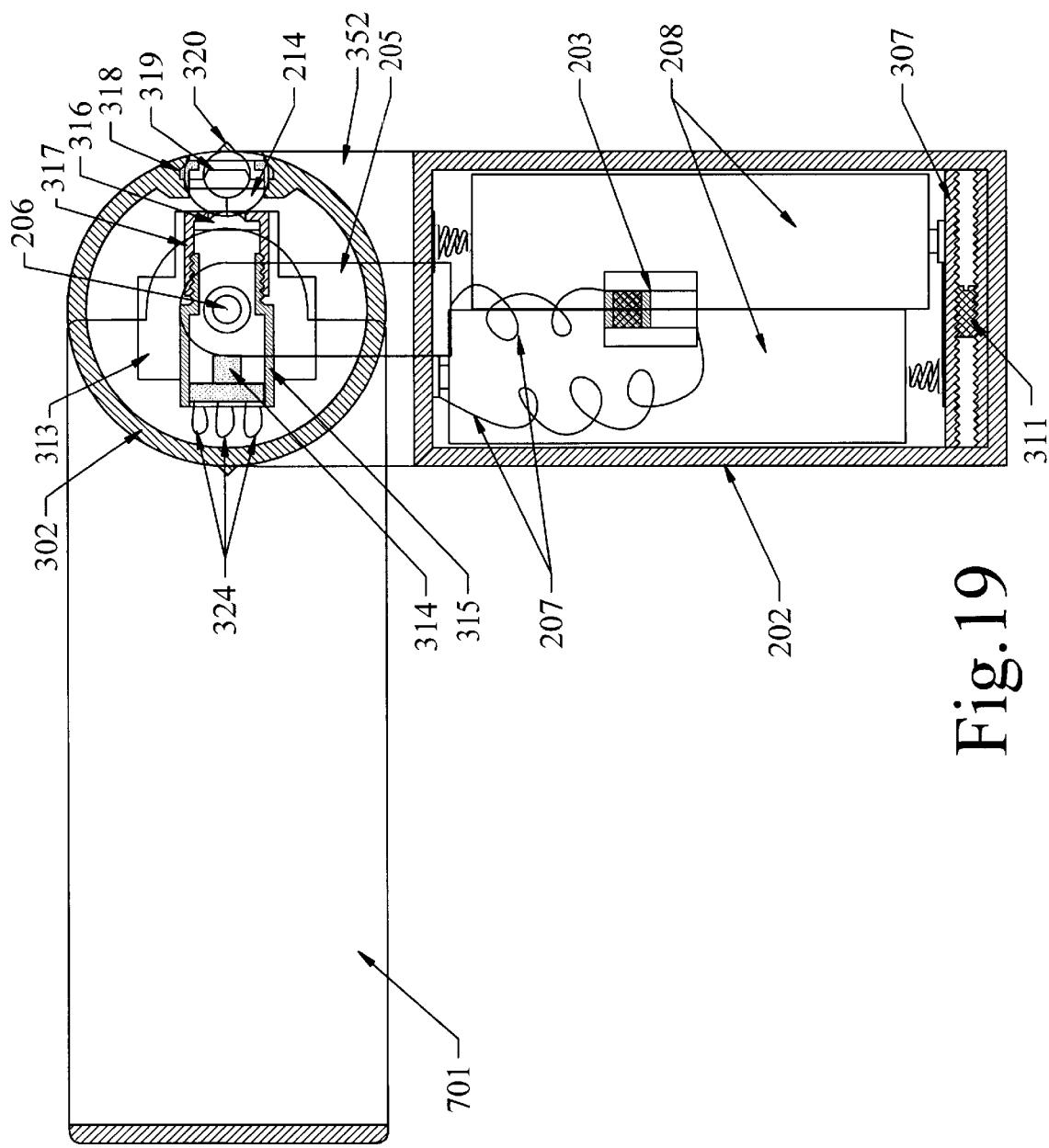
Figure 20:
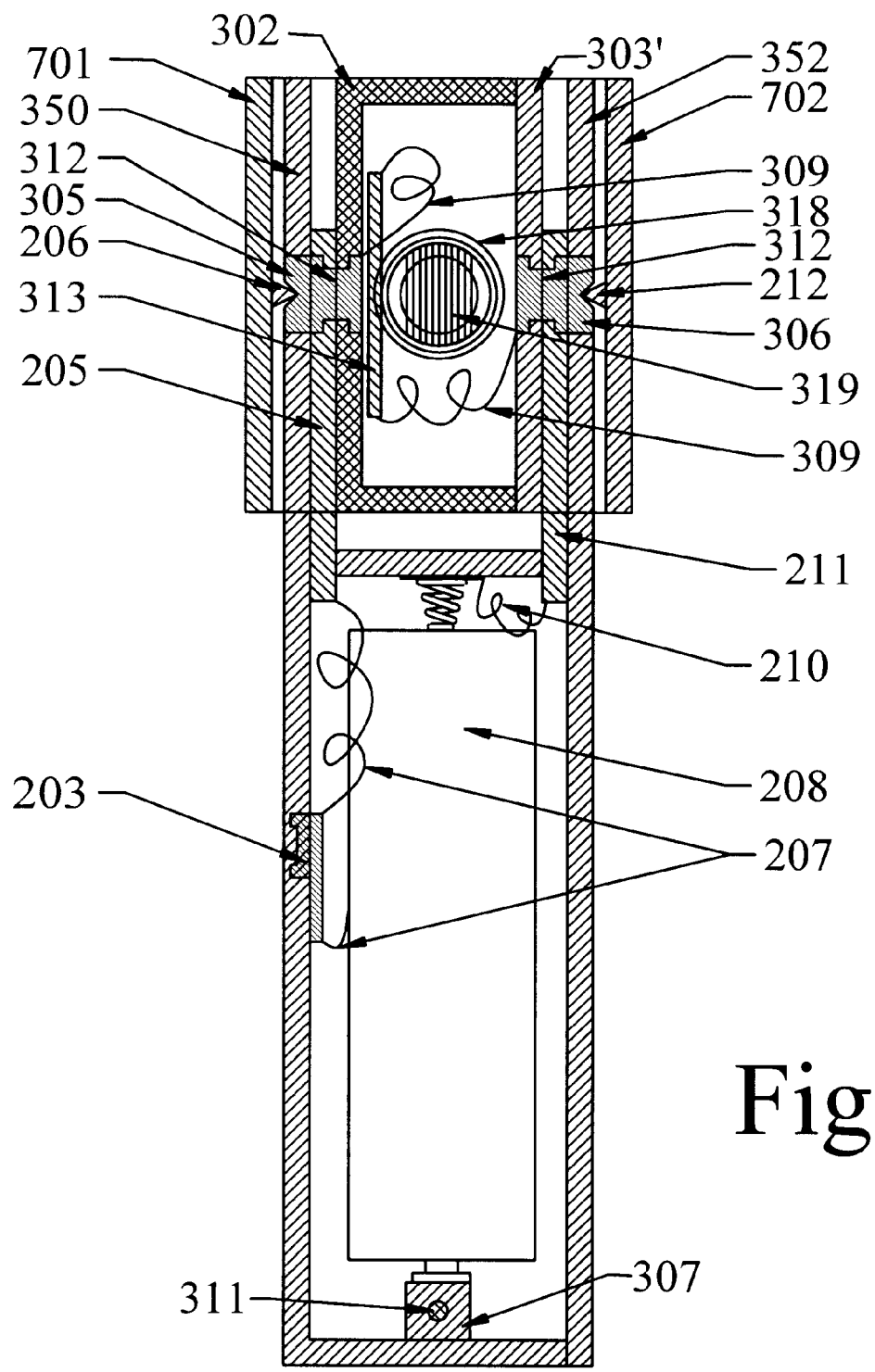

FIGS. 19 and 20 are, respectively, one and a half times life-size sectional views through FIGS. 18(a) and 18(c).

Figure 21C:
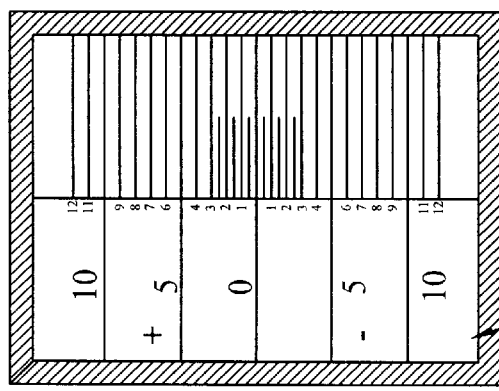
Figure 21A:
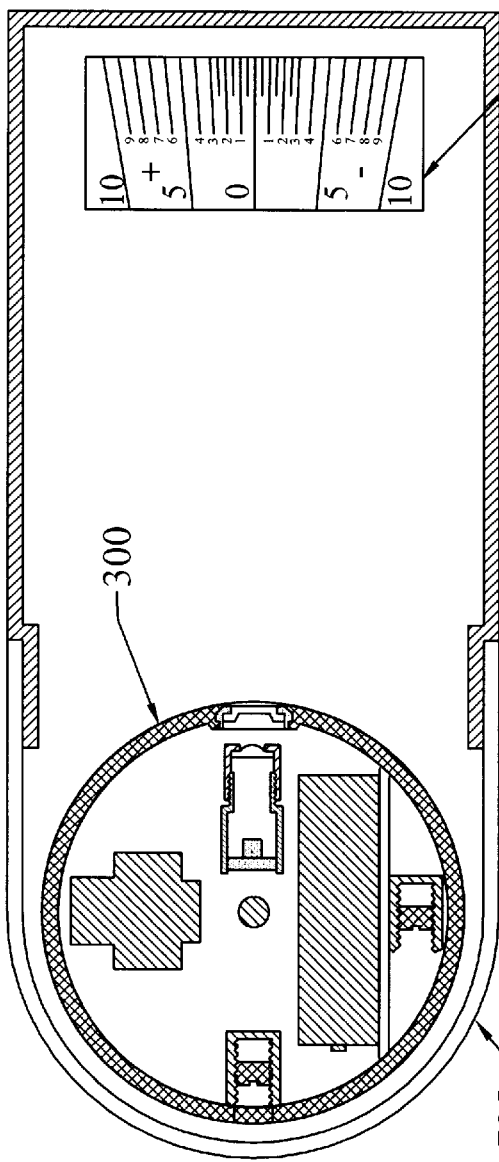
Figure 21B:
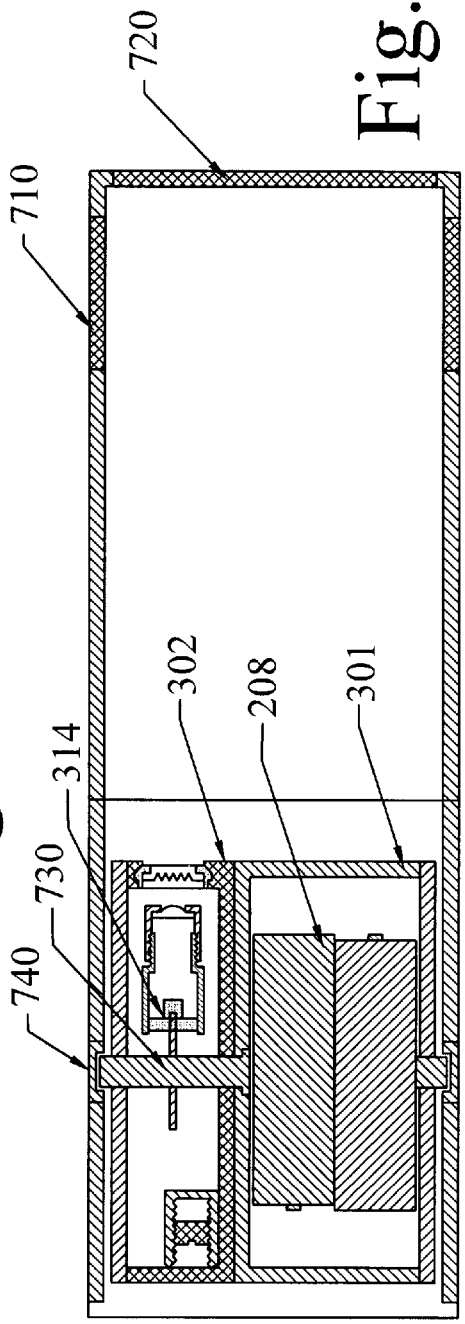

FIGS. 21(a), 21(b) and 21(c) show, respectively, life-size front, underneath and right end sectional views of a sixth embodiment of a laser light referencing tool according to the present invention.

In all of the accompanying drawings, like components are given like reference numbers.

A referencing tool 100 of the invention is illustrated generally in FIGS. 1 and 2, and in detail in FIGS. 3 to 6, and comprises case 200 and cylindrical assembly 300 manufactured from electrically non-conducting material.

Case 200 has battery compartment 202 containing batteries 208, front cover 201 and rear cover 209.

To the front cover 201 are attached on/off switch 203 for interrupting the electrical supply from the batteries 208, and locking device 204 which, when engaged, prevents cylindrical case 301 from being rotated by engaging in cut-out portion 304 of cylindrical case 301.

Also attached to the front cover 201 is electrically conducting strip of metal 205. One end of this strip is connected electrically to one pole of batteries 208 via wires 207 and switch 203. The other end of strip 205 contains threaded screw 206. This threaded screw is pointed at one end. This point engages in a conical depression let into metal disc 305 which is mounted on cylindrical assembly 300.

On rear cover 209 there is a similar strip 211, wire 210 and pointed threaded screw 212 which engages disc 306. When adjusted to the correct tension, screws 206 and 212 engage with discs 305 and 306 on cylindrical assembly 300 in such a way that electricity is supplied to cylindrical assembly 300 while allowing cylindrical assembly 300 to rotate freely.

Slot 213 is provided in the bottom of case 200 for purposes set forth hereinafter.

Cylindrical assembly 300 comprises cylindrical case 301 (first housing) and cylindrical case 302 (second housing) connected axially by stud 312. The friction between cylindrical cases 301 and 302 prevents them from rotating relative to each other, but this friction may be overcome by finger pressure, allowing cylindrical cases 301 and 302 to be rotated relative to each other and for them then to maintain that relative position.

Cylindrical case 301 has front cover 303 on which is mounted metal disc 305. Contained within cylindrical case 301 are eccentric weight 307 with adjustable fine balancing slug 311, and wire 308 which carries electricity from disc 305 to stud 312. When locking device 204 is released, cylindrical case 301 is turned by the effect of gravity on weight 307 and slug 311.

Cylindrical case 302 has a rear cover 303' on which are carried alignment markers 320 and 321, and on which is mounted metal disc 306. Contained within cylindrical case 302 are laser diode 314, its associated circuitry 313, optics 316 and 319, balancing weight 310 with adjustable fine balancing slug 311', and wires 309 electrically connecting laser diode circuitry 313 to stud 312 and disc 306.

Laser diode 314 in threaded barrel-shaped holder 315 is mounted radially in cylindrical case 302. A visible beam of light is generated by laser diode 314. This divergent beam is collimated by collimating lens 316 mounted in adjustable threaded barrel-shaped holder 317 and the resultant parallel beam of light is made to diverge solely in the generally horizontal plane by line generating lens 319 which is mounted in lens holder 318. With rear cover 209 held against, or in close proximity and generally parallel to, a generally vertical, generally flat surface, this beam will be visible over that surface as a line of light. By rotating cylindrical case 302 relative to cylindrical case 301, and aligning the marker 320 denoting the centre of line generating lens 319 with markings on cylindrical case 301 denoting the desired angle away from the horizontal, a visible reference line of light may be projected generally along the horizontal plane, or along any chosen angle away from the horizontal. Alignment marker 320 and rear alignment marker 321 indicate the axis along which the beam of light will be projected. In a similar way, when two points on a generally vertical surface are illuminated by the projected line of light, the angle between them, relative to the generally horizontal, may be determined by reading off the degree scale on the exterior of cylindrical case 301.

Figure 7:
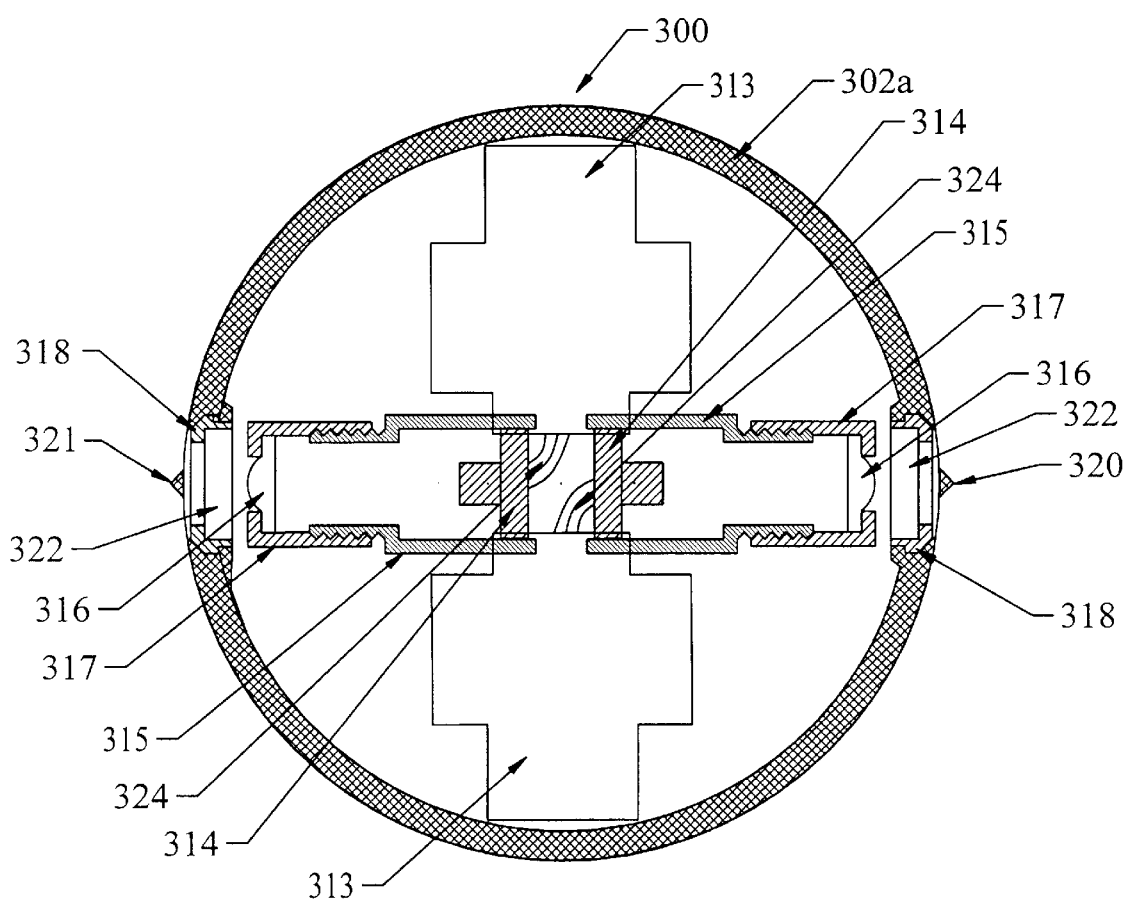
FIG. 7 is a twice life-size elevational sectional view through part of a second embodiment, showing particularly a cylindrical case containing a double laser diode assembly.

FIG. 7 shows an alternative embodiment of the invention. Save for the components contained in cylindrical case 302a, which replaces cylindrical case 302, the tool is identical to the embodiment of the invention described as tool 100.

In FIG. 7 a pair of laser diodes 314 in threaded barrel-shaped holders 315 are mounted radially in cylindrical case 302a. Control circuitry 313 is connected to laser diodes 314 via connecting wires 324. Balancing weights 310 and adjustable fine balancing slugs 311 have been omitted for clarity. Visible beams of light are generated by laser diodes 314. These divergent beams are collimated by collimating lenses 316 mounted in adjustable threaded barrel-shaped holders 317 and the resultant parallel beams of light are projected through plain lenses 322 which are mounted in lens holders 318.

When this alterative tool is held generally vertically, two points of light will be projected radially along the horizontal or, by rotating cylindrical case 302a relative to cylindrical case 301 as detailed above, at any preset angle away from the horizontal.

In a similar way, when two marked points are illuminated by the projected points of light, the angle between them, relative to the generally horizontal, may be determined by reading off the degree scale marked on the exterior of cylindrical case 301.

Figure 8:
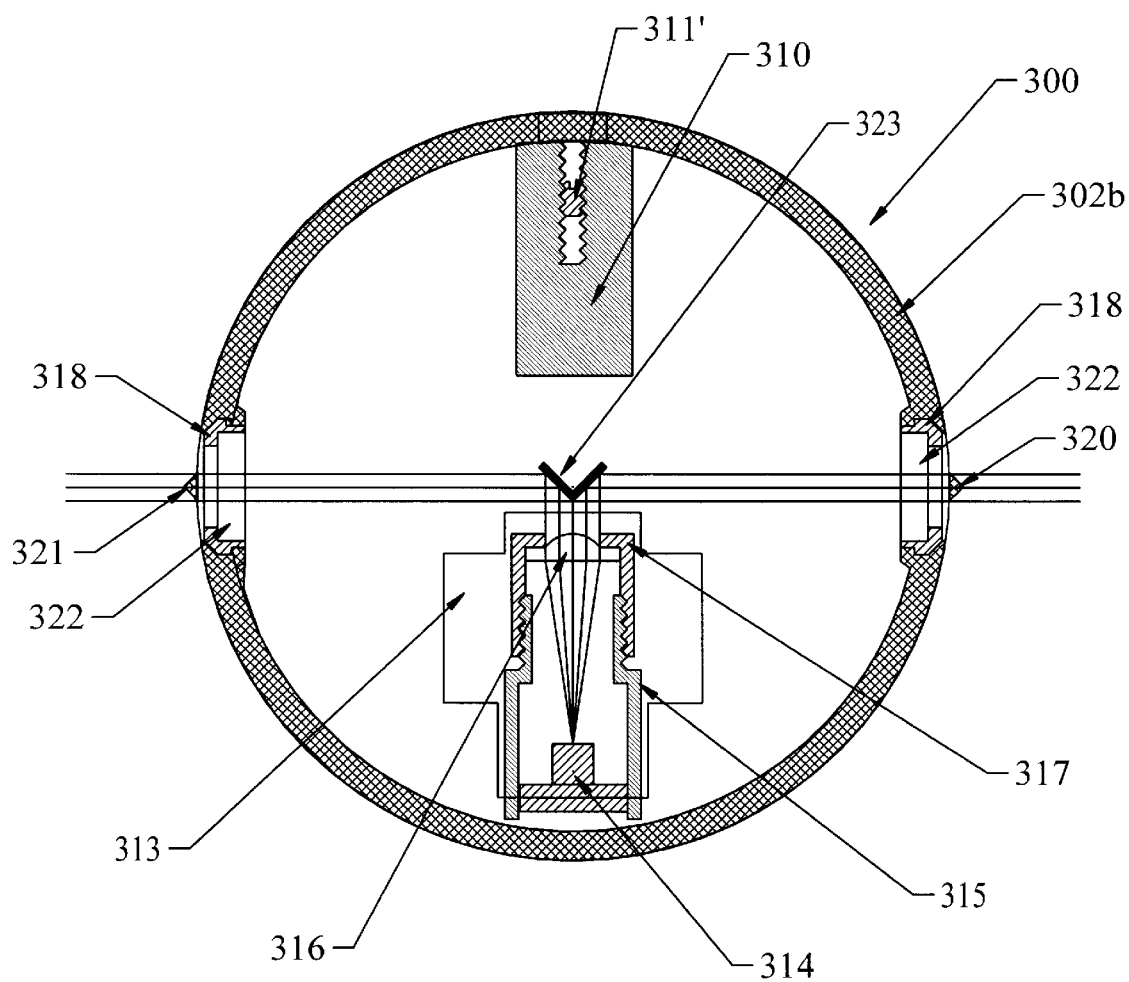
FIG. 8 is a twice life-size elevational sectional view through part of a third embodiment, showing particularly a cylindrical case containing a laser diode assembly, adjustable balancing weight and beam splitting mirror.

FIG. 8 shows an alterative embodiment to that shown in FIG. 7. A laser diode 314, in threaded barrel-shaped holder 315 is mounted radially in cylindrical case 302b. A visible beam of light is generated by laser diode 314. This divergent beam is collimated by collimating lens 316 mounted in adjustable threaded barrel-shaped holder 317 and the resultant parallel beam of light is directed towards the centre of cylindrical case 302b, where it is split by right-angled mirror 323. Points of light are projected from the tool as detailed above.

FIGS. 9 and 10 show a suitable case for carrying the tool and attaching it by various means to a substantially vertical surface, thus allowing hands-free operation within the range of the tool. Case 400 is open at one end. Raised ridge 402 engages with slot 213, thereby ensuring that a tool 100 of the present invention can only be fixed into case 400 in two ways. For carriage and storage, cylindrical assembly 300 enters first into case 400. For operation of the tool, case 200 is entered first into case 400. The cut-out section 406 in case 400 allows operation of switch 203 and locking device 204. Slots 403 and 404 in the rear of case 400 allow the case and tool to be attached to a substantially vertical surface. Various means 405 may be employed. These could include pin-type fixings, or suction cups or magnets, according to the type of surface. When attached by means of slot 403, the fixing device will be generally at the axis of cylindrical assembly 300, thus allowing for easy and accurate hands-free marking, up to the limit of the range of the tool. Slot 404 could be used to achieve a hands-free plumb-line. Raised studs 401 engage in depressions 407 on the outside of the tool, to hold tool and case securely together.

FIG. 11 shows a suitable accessory for enhancing the tool's versatility, allowing it to be used to provide a visible reference line as an extension to a surface, either substantially horizontal/vertical or along the same plane as the surface of origin, and as a tool for providing a visible reference line at any angle over any plane. Case 500 is open at both ends, thus allowing a tool 100 of the present invention to be mounted for right or left-handed operation. Tool and case engage with each other in the way described above. Referring to FIG. 11, when case 500 is placed on a body 502 to be referenced, the projected beam of light will be generally in the same plane as the surface 501 on which an exterior abutment surface of the tool is placed. When cylindrical assembly 300 is locked off at the zero degree position, the projected beam of light will be generally in the same plane as the surface to be referenced. Any deviations on the surface being referenced will thus be highlighted. When locked off, with cylindrical case 302 rotated away from the zero degree mark, reference lines of any preset angle may thus be projected across any plane. Thus, for instance, a simple and accurate means of marking up sheet materials may be achieved.

FIG. 12 shows an auxiliary tool for providing a means of overcoming the obscuring effect of strong ambient light. A small clip 600 is clipped onto a pencil or pen 601. Running down the centre of the face of clip 600 is a clearly marked white line 602. When placed in the path of the beam of light projected from tool 100, the red light of the laser will show clearly against the white line 602 of clip 600. Even when the ambient light is very strong, side and top extensions 603 of clip 600 will keep line 602 in shadow, thus increasing the contrast and visibility of the projected beam of light. Although clip 600 will not be needed in most working conditions, it is so small and lightweight that it can easily be included in the toolkit as a matter of course.

FIGS. 13 to 17 show a fourth embodiment in which, in addition to case 200 and cylindrical assembly 300, there is an intermediate pendular assembly 360.

The case 200 has battery compartment 202 containing batteries 208, front cover 201 and rear cover 209.

To the front cover 201 is attached on/off switch 203 for interrupting the electrical supply from the batteries 208. Also attached to the front cover 201 is electrically conducting strip of metal 205. One end of this strip is connected electrically to one pole of batteries 208 via wires 207 and switch 203. The other end of strip 205 contains threaded screw 206. This threaded screw is pointed at one end. This point engages in a conical depression let into metal disc 305 which is mounted on pendular assembly 360.

On rear cover 209 there is a similar strip 211, wire 210 and pointed threaded screw 212 which engages disc 306 which is mounted on pendular assembly 360.

Pendular assembly 360 comprises front and rear electrically non-conducting cover plates 350 and 352 attached to metal strips 351 and 353, connected to metal discs 305 and 306 separated by electrically non-conducting spacer 354.

Studs 312 connect cylindrical assembly 300 physically and electrically with pendular assembly 360. Friction prevents cylindrical assembly 300 from rotating freely, but this friction may be overcome by finger pressure, thus enabling cylindrical assembly 300 to be rotated to a preset angle relative to pendular assembly 360. Markings on the outside of cylindrical housing 302 allow the preset degree of rotation of cylindrical assembly 300, relative to the generally horizontal, to be viewed through cut-out window 215 in pendular assembly 360.

When adjusted to the correct tension, screws 206 and 212 engage with discs 305 and 306 in such a way that electricity is supplied to cylindrical assembly 300 via metal strips 351 and 353 and studs 312, while allowing pendular assembly 360 to pivot freely about screws 206 and 212.

Cylindrical assembly 300 comprises cylindrical housing 302 and rear cover 303'. Contained within cylindrical housing 302 are laser diode 314, its associated circuitry 313, optics 316 and 319, balancing weight 310 with adjustable fine balancing slug 311', wires 309 electrically connecting laser diode circuitry 313 to studs 312, and finally two matched weights 307. These weights give mass to cylindrical assembly 300, mounted at the end of pendular assembly 360, enabling pendular assembly 360 to align itself gravitationally with the generally vertical. Two weights are needed, as well as balancing weight 310 and fine balancing slug 311', so that cylindrical assembly 300 is generally in balance around its axis. Thus, when cylindrical assembly 300 is manually rotated to a preset angle, no bias is introduced which might deviate pendular assembly 360 away from the generally vertical.

Laser diode 314 in threaded barrel-shaped holder 315 is mounted radially in cylindrical housing 302. A visible beam of light is generated by laser diode 314. This divergent beam is collimated by collimating lens 316 mounted in adjustable threaded barrel-shaped holder 317 and the resultant parallel beam of light is made to diverge solely in the generally horizontal plane by line generating lens 319 which is mounted in lens holder 318. With rear cover 209 held against, or in close proximity and generally parallel to, a generally vertical, generally flat surface, this beam will be visible over that surface as a line of light. By rotating cylindrical assembly 300 relative to pendular assembly 360, and aligning markings on the outside of cylindrical housing 302 with markings on cut-out window 215 of pendular assembly 360 denoting the desired angle away from the horizontal, a visible reference line of light may be projected generally along the horizontal plane, or along any chosen angle away from the horizontal. In a similar way, when two points on a generally vertical surface are illuminated by the projected line of light, the angle between them, relative to the generally horizontal, may be determined by reading off the degree scale on the exterior of cylindrical housing 302.

FIGS. 18 to 20 show a fifth embodiment which differs from the fourth embodiment mainly in that here case 200 acts as a pendulum as a result of being pivotable relative to slip case/handle 700.

The slip case/handle 700 has a front plate 701 and rear plate 702 rigidly connected at one end. At the other end are set threaded, pointed screws 206 and 212. The points of these screws engage with conical depressions in metal discs 305 and 306.

Case 200 has battery compartment 202 containing batteries 208, weight 307 and fine balancing slug 311, front cover 350 and rear cover 352.

To front cover 350 is attached on/off switch 203 for interrupting the electrical supply from the batteries 208. Also attached to front cover 350 is electrically conducting metal strip 205. One end of this strip is connected electrically to one pole of batteries 208 via wires 207 and switch 203. The other end of strip 205 is attached to metal disc 305 and metal stud 312.

On rear cover 352 there is a similar strip 211, wire 210, disc 306 and stud 312.

Studs 312 connect cylindrical assembly 300 physically and electrically with case 200. Friction prevents cylindrical assembly 300 from rotating freely relative to case 200, but this friction may be overcome by finger pressure, thus enabling cylindrical assembly 300 to be rotated to a preset angle relative to case 200. Markings on the outside of cylindrical housing 302 allow the preset degree of rotation of cylindrical assembly 300, relative to the generally horizontal, to be viewed through cut-out window 214 in case 200.

When adjusted to the correct tension, screws 206 and 212 engage with discs 305 and 306 in such a way that case 200 and cylindrical assembly 300 may pivot freely about screws 206 and 212. This allows case 200 to align itself gravitationally with the generally vertical. As cylindrical assembly 300 is frictionally attached to case 200, this generally vertical alignment will also turn cylindrical assembly 300 about its axis. Any imbalance in case 200 may be rectified by the adjustment of fine balancing slug 311.

Cylindrical assembly 300 comprises cylindrical housing 302 and rear cover 303'. Contained within cylindrical housing 302 are laser diode 314 connected electrically by wires 324 to its associated circuitry 313, optics 316 and 319, and wires 309 electrically connecting laser diode circuitry 313 to studs 312.

Laser diode 314 in threaded barrel-shaped holder 315 is mounted radially in cylindrical housing 302. A visible beam of light is generated by laser diode 314. This divergent beam is collimated by collimating lens 316 mounted in adjustable threaded barrel-shaped holder 317 and the resultant parallel beam of light is made to diverge solely in the generally horizontal plane by line generating lens 319 which is mounted in lens holder 318. With rear cover 702 held against, or in close proximity and generally parallel to, a generally vertical, generally flat surface, this beam will be visible over that surface as a line of light. By rotating cylindrical assembly 300 relative to case 200, and aligning markings on the outside of cylindrical housing 302 with markings on cut-out window 214 of case 200 denoting the desired angle away from the horizontal, a visible reference line of light may be projected generally along the horizontal plane, or along any chosen angle away from the horizontal. In a similar way, when two points on a generally vertical surface are illuminated by the projected line of light, the angle between them, relative to the generally horizontal, may be determined by reading off the degree scale on the exterior of cylindrical housing 302.

FIG. 21 shows a sixth embodiment in the form of a hand-held referencing tool particularly suitable for levelling, plumbing, aligning and projecting reference lines over a generally flat surface.

Cylindrical assembly 300 is mounted in a holding case 700 of hollow rectangular section and is enclosed at one end of the tool by a curved clear window 705 which can be a friction fit with the case.

At the other end of the tool are three translucent windows 710 and 720. These windows have markings parallel to the top and bottom surfaces of the tool. When the two halves of cylindrical assembly 300 are arranged so that the line of laser light is transmitted through the body of the tool, the line projected across windows 710 and 720 will show the alignment of the body of the tool with the preset angle.

Figure 2C:
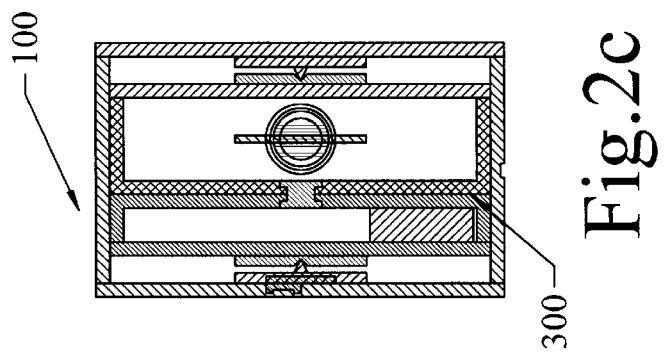
Figure 2A:
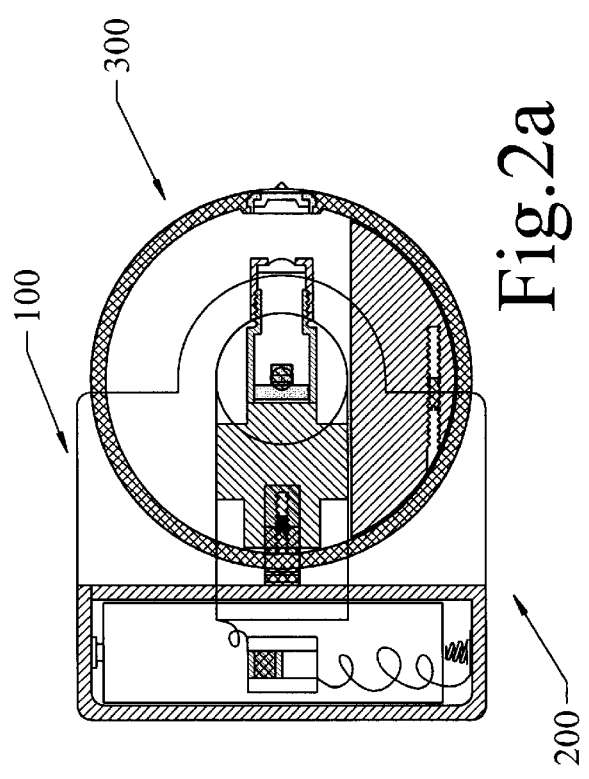
Figure 2B:
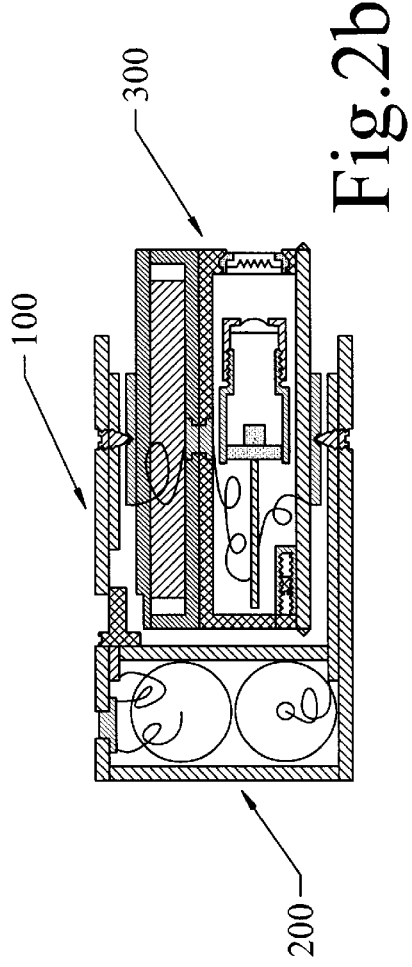

Cylindrical assembly 300 is similar to that illustrated in FIGS. 2a, 2b and 2c, but the eccentric weight 307 used previously has been replaced by batteries 208.

Moreover, the pointed screws 206, 212 used previously have been replaced by a magnetised suspension assembly including a magnetised axial rod 730, the ends of which are held suspended magnetically in housings 740 of similar polarity.

Thus, at each end of the rod, the housing and the rod end repel each other, and cylindrical assembly 300 can align gravitationally with no error introduced by friction at the rod ends.

A proximity switch may be used to interrupt the electrical flow from the batteries to the laser diode.

Thus, in addition to the versatility of the tool when used in line projecting mode, the functionality of a traditional spirit-level may be mimicked, but with greater accuracy, visibility and ease of use.

I claim:

1. A laser light referencing tool comprising laser means for emitting a visible laser beam, portable power means for powering the laser means, and gravity-responsive directional means for establishing a datum direction for the laser means, wherein control means is provided for operatively linking the laser means to the gravity-responsive directional means, whereby the direction of the visible laser beam emitted by the laser means relatively to the datum direction established by the gravity-responsive directional means can be selectively altered, to give a chosen angle between the direction of the visible laser beam and the datum direction, with subsequent movement of the directional means in response to gravity automatically causing simultaneous self-adjusting of the direction of the visible laser beam emitted by the laser means to maintain said chosen angle between the direction of the visible laser beam and the datum direction.

2. A laser light referencing tool according to claim 1, in which the control means is based on friction.

3. A laser light referencing tool according to claim 2, in which the friction is adjustable.

4. A laser light referencing tool according to claim 1, in which the laser means comprises one or more laser diodes, and the portable power means comprises one or more batteries.

5. A laser light referencing tool according to claim 1, in which optical means is provided such that the visible laser beam is divergent in a single plane.

6. A laser light referencing tool according to claim 1, in which optical means is provided such that the visible laser beam is substantially non-divergent.

7. A laser light referencing tool according to claim 1, in which two visible laser beams are produced directed along the same line but in opposite directions.

8. A laser light referencing tool according to claim 1, in which the laser means is contained within a first cylindrical housing, and the gravity-responsive directional means is contained within a second cylindrical housing, said first and second cylindrical housings being axially attached to one another to permit relative rotation therebetween.

9. A laser light referencing tool according to claim 8, in which an adjustable weight is contained in said first cylindrical housing for allowing said first cylindrical housing and its contents to be maintained substantially in balance around its axis.

10. A laser light referencing tool according to claim 8, in which a mechanical locking device is provided for allowing said second cylindrical housing and its contents to be rendered immobile.

11. A laser light referencing tool according to claim 8, in which the laser means, the portable power means and the gravity-responsive directional means are insertable within a holding case.

12. A laser light referencing tool according to claim 11, in which the holding case comprises an exterior abutment surface lying substantially in the plane of the visible laser beam.

13. A laser light referencing tool according to claim 1, in which the laser means is contained within a cylindrical housing which is rotatably mounted at one end of an elongate pendular assembly with the other end of the elongate pendular assembly being rotatably mounted to a holding case.

14. A laser light referencing tool according to claim 1, in which the laser means is contained within a cylindrical housing which is rotatably mounted at one end of an elongate pendular assembly with said one end of the elongate pendular assembly also being rotatable mounted to a holding case.

15. A laser light referencing tool according to claim 1, in which the gravity-responsive directional means comprises the portable power means.

16. A laser light referencing tool according to claim 8, in which said first and second cylindrical housings are rotatably mounted at one end of a holding case.

17. A laser light referencing tool according to claim 16, in which said first and second cylindrical housings are rotatably mounted to the holding case by means of a magnetised suspension assembly.

18. A laser light referencing tool according to claim 16, in which access to said first and second cylindrical housings is via a curved clear window which is a friction fit with the holding case.

19. A laser light referencing tool according to claim 16, in which the other end of the holding case is provided with a plurality of translucent windows carrying parallel markings.

20. A laser light referencing tool according to claim 19, in which there are three translucent windows arranged respectively at said other end and at two sides of the holding case.

* * * * *